(12) United States Patent
Bai

(10) Patent No.: US 12,171,381 B2
(45) Date of Patent: *Dec. 24, 2024

(54) COUNTERMOUNT FLUID DISPENSER

(71) Applicant: Peter Bai, Placentia, CA (US)

(72) Inventor: Peter Bai, Placentia, CA (US)

( * ) Notice: Subject to any disclaimer, the term of this patent is extended or adjusted under 35 U.S.C. 154(b) by 334 days.

This patent is subject to a terminal disclaimer.

(21) Appl. No.: 17/956,621

(22) Filed: Sep. 29, 2022

(65) Prior Publication Data
US 2023/0023704 A1 Jan. 26, 2023

Related U.S. Application Data

(63) Continuation-in-part of application No. 17/587,690, filed on Jan. 28, 2022, now Pat. No. 11,992,164, which is a continuation-in-part of application No. 16/740,146, filed on Jan. 10, 2020, now Pat. No. 11,297,983, which is a continuation-in-part of application No. 16/559,234, filed on Sep. 3, 2019, now Pat. No. 11,234,563.

(51) Int. Cl.
*A47K 5/12* (2006.01)
*F16B 21/02* (2006.01)

(52) U.S. Cl.
CPC ............ *A47K 5/1202* (2013.01); *F16B 21/02* (2013.01); *A47K 2005/1218* (2013.01)

(58) Field of Classification Search
CPC .......... A47K 5/1202; A47K 2005/1218; A47K 2201/00; A47K 5/14; A47K 5/1217; F16B 21/02; F16B 5/0056; B05B 12/122; B05B 7/0062
See application file for complete search history.

(56) References Cited

U.S. PATENT DOCUMENTS

| | | | | |
|---|---|---|---|---|
| 1,789,338 A * | 1/1931 | Kooperstein | ........ | B67D 7/0205 222/385 |
| 4,938,384 A * | 7/1990 | Pilolla | .................. | A47K 5/1217 250/221 |
| 6,119,901 A * | 9/2000 | Hanna | .................. | A47K 5/1205 222/372 |
| 8,579,157 B2 * | 11/2013 | Bem | ........................ | A47K 5/12 222/173 |
| 11,992,164 B2 * | 5/2024 | Bai | ........................ | B05B 7/0062 |
| 2002/0185500 A1 * | 12/2002 | Muderlak | ................. | A61L 9/12 222/1 |
| 2005/0087557 A1 * | 4/2005 | Oliver | .................. | A47K 5/1217 222/251 |
| 2007/0187427 A1 * | 8/2007 | Shaw | .................... | A47K 5/1202 222/173 |

(Continued)

*Primary Examiner* — Bob Zadeh
(74) *Attorney, Agent, or Firm* — Clement Cheng

(57) ABSTRACT

A counter mount fluid dispenser has a spout having an opening for dispensing a fluid. The connection shaft extends downwardly from the spout. A swivel base is mounted to the connection shaft. The swivel base swivels relative to the connection shaft. The swivel base includes a mounting shaft having a mounting shaft nut that is configured with the spout to engage a countertop by clamping force. The mounting shaft nut has a mounting shaft nut lower extension. A mounting shaft nut external thread is formed on an external surface of the mounting shaft nut lower extension. A mounting shaft nut retainer is threaded to the mounting shaft nut lower extension.

9 Claims, 27 Drawing Sheets

(56) References Cited

U.S. PATENT DOCUMENTS

| | | | |
|---|---|---|---|
| 2014/0231450 A1* | 8/2014 | Rosko | A47K 5/1211 222/52 |
| 2015/0313421 A1* | 11/2015 | Wang | A47K 5/1211 222/52 |
| 2020/0100628 A1* | 4/2020 | Wang | A47K 5/1217 |
| 2023/0023704 A1* | 1/2023 | Bai | B05B 7/0062 |

* cited by examiner

COUNTERMOUNT FLUID DISPENSER

This application is a continuation in part of and claims priority from same inventor Peter Bai's co-pending U.S. utility patent Ser. No. 17/587,690 filed Jan. 28, 2022 also entitled Countermount Foam Dispenser, which is a continuation in part of and claims priority from same inventor Peter Bai's U.S. utility patent application Ser. No. 16/740,146 filed Jan. 10, 2020 also entitled Countermount Foam Dispenser, now patented as U.S. Pat. No. 11,297,983 which was a continuation in part of and claimed priority from same inventor Peter Bai's U.S. utility patent application Ser. No. 16/559,234 filed Sep. 3, 2019 also entitled Countermount Foam Dispenser, now patented as U.S. Pat. No. 11,234,563 the disclosures of which are incorporated herein by reference.

FIELD OF THE INVENTION

The present invention is in the field of counter mounted fluid dispensers.

DISCUSSION OF RELATED ART

A variety of different prior art references show countertop soap dispensers. For example, in the U.S. Pat. No. 9,795,255, Electronic Soap Dispenser by inventor Michael Scot Rosko, published Oct. 24, 2017 the abstract discloses, "An electronic soap dispenser includes an upper dispensing head supported above a sink deck, and a liquid soap reservoir and a pump assembly supported below the sink deck. A capacitive sensor is operably coupled to the dispensing head. A controller is in electrical communication with the capacitive sensor and activates the pump assembly in response to input from the capacitive sensor."

For example, in the U.S. Pat. No. 6,929,150, System And Method For Dispensing Soap by inventor Kenneth J. Muderlak, published Aug. 16, 2005 the abstract discloses, "A method of dispensing soap from a fluid dispensing system is disclosed. The method includes the steps of presenting a tube having a tube end disposed at a first position within an indented portion of a spout of the fluid dispensing system, sensing an object below the tube end, in response to sensing the object, expelling said soap from the tube end by drawing the tube end further within the indented portion to a second position, and returning the tube end to the first position"

For example, in the United States publication number 2009/0152293, Counter-Mounted Solution Dispenser With Counter-Protective Platform by inventor Richard C. Sayers, published Jun. 18, 2009 the abstract discloses, "A dispensing station is mounted to a counter and includes a container that is retained under the counter to hold a volume of no-rinse hand-treatment product. A protective platform is positioned on the top surface of the counter, and a faucet structure has an outlet positioned over the protective platform. A pump communicates with the volume of no-rinse hand-treatment product in the container, and a dispensing conduit extends through the faucet structure, communicating between the pump and the outlet of the faucet structure such that actuation of the pump causes no-rinse hand-treatment product to be dispensed at the outlet and directed toward the protective platform. This dispensing station will encourage the use of no-rinse hand-treatment products by providing a well-defined station, similar to the stations defined by common sinks."

For example, in the U.S. Pat. No. 8,544,698, Foam Dispenser With Stationary Dispensing Tube by inventor Nick E. Ciavarella, published Oct. 1, 2013 the abstract discloses, "Dispensers are provided including pumps for dispensing a foamed product out of an outlet provided in a dispensing tube. The foam is created from the mixing of a foamable liquid and air, with separate pumps being provided for each component. The dispensing tube is stationary, although the pumps themselves have parts that must move to dispense the foamed product. A single actuator operates both the liquid and air pumps. Additionally, in some embodiments, the air pump advances air before the liquid pump advances liquid. These pumps are particularly suited to the dispensing of a foamed skin care or skin sanitizing product."

For example, in the U.S. Pat. No. 7,364,053, Sink Side Touchless Foam Dispenser by inventor Heiner Ophardt, published Apr. 29, 2008 the abstract discloses, "A soap dispenser, preferably a sink side counter mounted dispenser, to dispense foamed liquid soap by mixing in an outlet of a soap spout liquid, soap and air preferably provided from a liquid soap pump and a air pump located remote from the faucet"

For example, in the U.S. Pat. No. 7,025,227, Electronic Soap Dispenser by inventor Steven R. Oliver, published Apr. 11, 2006 the abstract discloses, "A liquid soap dispenser includes a housing, a shank that engages a base of the housing, a soap path retainer disposed in the interior of the housing, a shank adapter disposed in the shank, and an infrared sensor to sense the presence of a user. A generally continuous passageway is defined through the shank adapter and the soap path retainer such that an elongated soap delivery tube of a liquid soap reservoir may be inserted through the passageway from the bottom of the soap dispenser to the spout end. The reservoir may be attached to the bottom end of the shank adapter. The soap path retainer is preferably formed of complementary halves, such as by plastic injection molding, that mate together to provide a curved passageway from near the base of the housing to the soap dispensing end and to support the sensor assembly."

For example, in the U.S. Pat. No. 8,100,299, Counter-Mounted Viscous Liquid Dispenser and Mounting System by inventor Stephen Lawrence Phelps, published Jan. 24, 2012 the abstract discloses, "The present invention provides an in-counter viscous liquid dispensing system. The features of the viscous liquid dispensing system include a quick mounting reservoir assembly that allows an installer to install the reservoir assembly in any orientation of the reservoir assembly to the counter mounted parts of the system. Other features include a mounting system which allows an installer to install the in-counter dispensing system without the need to work both above and below the counter top."

For example, in the U.S. Pat. No. 8,371,474, Fluid Dispenser by inventor Paul Francis Tramontina, published Feb. 12, 2013 the abstract discloses, "The invention is a method of dispensing a fluid and a dispenser which will dispense an appropriate amount of fluid to effectively clean a user's hand, even if the dispenser is inactive for a period of time."

For example, in the United States publication number 2014/0263421A1, Counter Mount Above-Counter Fill Dispensing System And Refill Units for Same by inventor Scott E. Urban, published Sep. 18, 2014 the abstract discloses, "Exemplary embodiments of dispensing systems and refill units for dispensing systems are provided. One exemplary refill unit for a counter mount dispenser includes a collapsed bag and a tube extending down into the collapsed bag. A fitment is secured to the collapsed bag. The fitment has a filling orifice. A pump for pumping fluid out of the bag is also provided. The collapsed bag fits through an opening in a countertop so that the collapsed bag may be inserted from above the countertop through the opening and at least a part of the collapsed bag extends below the countertop. The collapsed bag is configured to be filled with a liquid after being inserted through the opening in the countertop and the volume of the collapsed bag expands when the collapsed bag is filled with liquid."

For example, in the U.S. Pat. No. 8,770,440, Countertop Automatic Foam Soap Dispenser by inventor Moses-B. Lin, published Jul. 8, 2014 the abstract discloses, "A countertop automatic foam soap dispenser includes an automatic foam soap dispenser body, a soap liquid container, a circular connecting tube and a battery compartment. The soap liquid container is filled with an appropriate quantity of liquid soap. The battery compartment supplies electric power to the automatic foam soap dispenser body. The automatic foam soap dispenser body is passed through the circular connecting tube by a soap transmission tube and installed to the bottom inside the soap liquid container. The automatic foam soap dispenser body includes a foam soap valve, a control circuit board, a sensor, a motor controlled by the control circuit board, and a transmission gear set. When a user's hand approaches a sensor of the automatic foam soap dispenser body, the motor drives a cam of the transmission gear set to rotate and compress a foam soap valve to supply the appropriate quantity of foam soap."

Also for example, in the United States patent publication 2016/0256016, entitled Foaming Soap Dispensers by inventor Yang, published Sep. 8, 2016, shows a soap pump with a membrane type pump unit. The Yang application was issued as U.S. Pat. No. 10,076,216 on Sep. 18, 2018 entitled Foaming Soap Dispensers. The Yang device has a drawback that the membrane used can become loose and lead to leakage of liquid into the motor area. The above references are incorporated herein by reference.

SUMMARY OF THE INVENTION

A countertop foam dispenser has a spout made of a spout extension front housing and a spout extension rear housing. The spout includes a spout nozzle with a spout opening. A spout mounting shaft is mounted to the spout at a mounting shaft bracket. A mixer pump housing has a spout retainer latch. The mixer pump housing houses a mixer pump. The mixer pump includes a motor. A retainer notch is formed on the lower portion of the spout. The retainer notch is configured to engage the spout retainer latch. A bottle contains liquid soap. The bottle has a connection to the mixer pump housing.

Batteries are housed in the mixer pump housing. The batteries power the mixer pump for extracting liquid soap from the bottle. The batteries also power a circuit board mounted in the mixer pump housing, and the batteries also power a sensor. The sensor is mounted to the spout extension front housing. The mixer pump housing also has a battery tray for retaining the batteries. The battery tray has a tray door latch cam with a pair of indents, namely a first latch indent and a second latch indent. The pair of indents receive respectively a first key protrusion and a second key protrusion formed on a tray door key. The tray door latch cam travels between a closed position and an open position during a rotation of the tray door latch cam.

The bottle further includes a bottle sidewall extending vertically and a shoulder extending from the bottle sidewall at an upper portion of the bottle. A bottle neck extends upwardly from the shoulder. The bottle neck includes a neck groove interrupted by a rotation stop. The rotation stop is formed as a protrusion that protrudes horizontally away from the neck. An adapter mounted to the bottle neck. The adapter has an adapter sidewall. The adapter sidewall includes adapter protrusions extending away from the sidewall. The adapter includes adapter hooks configured to permanently snap to the neck groove and form a seal between the neck and the adapter. An adapter gasket has an adapter port opening for forming a seal. The adapter gasket is mounted to an adapter port of the adapter. The adapter is configured to mount to a bottle adapter receiver frame.

The mixer pump housing also has a bottle adapter receiver frame. The bottle adapter receiver frame includes a bottle adapter receiver with bottle adapter retainer slots. The bottle adapter retainer slots include a bottle adapter intake funnel and a bottle adapter retainer bump. Preferably, the batteries are retained on a battery tray that is locked with a battery tray key. The battery tray key rotates the tray door latch cam. The tray door latch cam has a circular profile.

The mixer pump housing further includes an upper alignment indent formed on a bottle adapter receiver frame. The upper alignment indent forms an upper alignment edge. The bottle further includes a lower alignment indent forming a lower alignment indent edge. The upper alignment edge and the lower alignment edge align when the bottle is in an engaged position.

The motor includes a motor shaft which has a crank. The crank actuates a piston handle, and the piston handle depresses a piston diaphragm at piston diagram tips. The piston diaphragm tips are configured to change the volume of the piston diaphragm when the piston handle depresses the piston diaphragm. The piston diaphragm is connected to an output nozzle cover via a filter net assembly. The piston diaphragm is configured to change the pressure against an output cover. The piston diaphragm aspirates air from an air inlet port, and blows the air to mix the air with liquid soap at a mixer separated from the piston diaphragm.

The diaphragm is mounted to the mixer pump. The diaphragm has three diaphragm cups, namely a first diaphragm cup, a second diaphragm cup, and a third diaphragm cup. The first diaphragm cup is configured to pump air, and the second diaphragm cup is configured to pump air. The third diaphragm cup is configured to pump liquid. The diaphragm pumps both liquid and air without mixing the liquid with the air. A mixer is located in the spout. The mixer receives pressurized air from the mixer pump. The mixer receives pressurized liquid from the mixer pump. The pressurized air and the pressurized liquid mix to form a foam.

A partition pump manifold has an air partition and a liquid partition. The liquid partition segments a liquid conduit proximal portion from a liquid conduit distal portion. The air partition segments and air conduit proximal portion from an air conduit distal portion. An adapter is mounted to the bottle neck which may have adapter protrusions extending away from the bottle neck. The adapter includes adapter hooks configured to permanently snap to the neck groove and form a seal between the neck and the adapter.

A counter mount soap dispenser includes a spout having an opening for dispensing soap. A connection shaft extends downwardly from the spout. A swivel base mounted to the connection shaft swivels relative to the connection shaft to allow easy connection. Tubing connected to the swivel base are flexible and flex with the rotation of the swivel base. A first tube extension and a second tube extension extend from the swivel base. A extends barrel extending upwardly from a soap reservoir. The barrel has a barrel socket that receives the connection shaft. The barrel socket defines a barrel inside sidewall.

A first tube socket is formed in the barrel socket. The first tube socket receives the first tube extension. A second tube socket is formed in the barrel socket. The second tube socket receives the second tube extension.

The barrel has a first vertical alignment slot and a second vertical alignment slot. The swivel base has a first alignment pin that engages the first vertical alignment slot. The swivel base has a second alignment pin that engages the second vertical alignment slot. The barrel also has a first ramp and a second ramp. The first ramp is formed on the barrel inside sidewall, and the second ramp is formed on the barrel inside sidewall.

The counter mount soap dispenser preferably includes a first vertical alignment slot on the barrel and a second vertical alignment slot on the barrel inside sidewall. The swivel base further includes a first alignment pin that engages the first vertical alignment slot. The swivel base further includes a second alignment pin that engages the second vertical alignment slot. A plurality of retaining nubs is formed in the barrel socket such that protrudes from the barrel inside sidewall. The plurality of retaining nubs fit into swivel tip slots formed on an exterior surface of the connection shaft. The plurality of retaining nubs limits a rotation of the connection shaft relative to the barrel. The plurality of retaining nubs include ten retaining nubs, and the swivel tip slots include ten swivel tip slots. The ten retaining nubs engage the ten swivel tip slots. A swivel stop protrudes from the connection shaft. The swivel stop stops a rotation of the swivel base by abutting the first alignment pin and the second alignment pin. The first ramp ends at the first vertical alignment slot, and the second ramp ends at the second vertical alignment slot The connection of the first tube socket to the first tube extension provides a continuous first conduit. The connection of the second tube socket to the second tube extension provides a continuous second conduit. Retaining nubs are formed in the barrel socket such that they protrude from the barrel inside sidewall. The retaining nubs fit into swivel tip slots formed on an exterior surface of the connection shaft. The retaining nubs limit a rotation of the connection shaft relative to the barrel.

The first vertical alignment slot and the second vertical alignment slot segment the barrel inside sidewall into a major barrel inside sidewall and a minor barrel inside sidewall. The major barrel inside sidewall is larger than the minor barrel inside sidewall in terms of surface area. Six of the retaining nubs are formed on the major barrel inside sidewall, and four of the retaining nubs are formed on the minor barrel inside sidewall.

A counter mount soap dispenser has a spout having an opening for dispensing soap. A connection shaft extends downwardly from the spout. The connection shaft has connection shaft threads. The connection shaft connects to the mixer pump housing. A mounting shaft nut has mounting shaft nut internal threads that engage the connection shaft threads. The mounting shaft nut further includes mounting shaft nut external threads. A mounting shaft nut retainer threadedly connects to the mounting shaft nut external threads. A pump outlet opening flange is formed on a barrel that extends upwardly from a pump outlet opening on the mixer pump housing. A swivel socket circlip clips onto the mounting shaft nut retainer and pump outlet opening flange to suspend the mixer pump housing.

The counter mount soap dispenser optionally has a swivel socket circlip upper slot configured to retain the mounting shaft nut retainer to the pump outlet opening flange. The lower barrel flange is also formed on the barrel. A swivel socket circlip lower slot is configured to retain the lower barrel flange. A circlip slot ridge is formed to lodge between the pump outlet opening flange and the lower barrel flange. A pump outlet opening slot is formed between the pump outlet opening flange and the lower barrel flange. The pump outlet opening slot is configured to receive the circlip slot ridge. A sensor cable slot is formed on the barrel to receive a sensor cable. The sensor cable travels through the sensor cable slot and into the spout mounting shaft.

A counter mount fluid dispenser has a spout having an opening for dispensing a fluid. The connection shaft extends downwardly from the spout. A swivel base is mounted to the connection shaft. The swivel base swivels relative to the connection shaft. The swivel base is can be connected to a mounting shaft having a mounting shaft nut that is configured with the spout to engage a countertop by clamping force. The mounting shaft nut has a mounting shaft nut lower extension. A mounting shaft nut external thread is formed on an external surface of the mounting shaft nut lower extension. A mounting shaft nut retainer is threaded to the mounting shaft nut lower extension. A swivel socket circlip, wherein the swivel socket circlip has a swivel socket circlip upper slot, and the swivel socket circlip upper slot engages a pump outlet opening flange and the mounting shaft nut retainer. The pump outlet opening flange is connected to a pump housing to support the pump housing when the swivel socket circlip is installed to the pump outlet opening flange and the mounting shaft nut retainer. A fluid pump is mounted in the pump housing.

The mounting shaft nut retainer has a mounting shaft nut retainer engagement that engages a swivel socket circlip engagement so that the swivel socket circlip acts as a wrench for rotating the mounting shaft nut retainer. After installation of the mounting shaft nut retainer engagement to the swivel socket circlip engagement, rotation of the swivel socket circlip also rotates the mounting shaft nut retainer and locks the swivel socket circlip to the mounting shaft nut retainer when the mounting shaft nut retainer is rotated away from the pump outlet opening flange. The swivel socket circlip upper slot has a swivel socket circlip upper slot surface that biases against a mounting shaft nut retainer upper surface. The swivel socket circlip upper slot has a swivel socket circlip upper slot lower surface that biases against a pump outlet opening flange lower surface when the mounting shaft nut retainer is rotated away from the pump outlet opening flange.

The swivel socket circlip further includes a swivel socket circlip lower slot, and the swivel socket circlip lower slot engages a lower barrel flange. The lower barrel flange is formed under the pump outlet opening flange on an upwardly extending barrel formed on the pump housing. The swivel socket circlip upper slot has a swivel socket circlip upper slot surface that biases against a mounting shaft nut retainer upper surface. The swivel socket circlip upper slot has a swivel socket circlip upper slot lower surface that biases against a pump outlet opening flange lower surface when the mounting shaft nut retainer is rotated away from the pump outlet opening flange.

Figure 1:
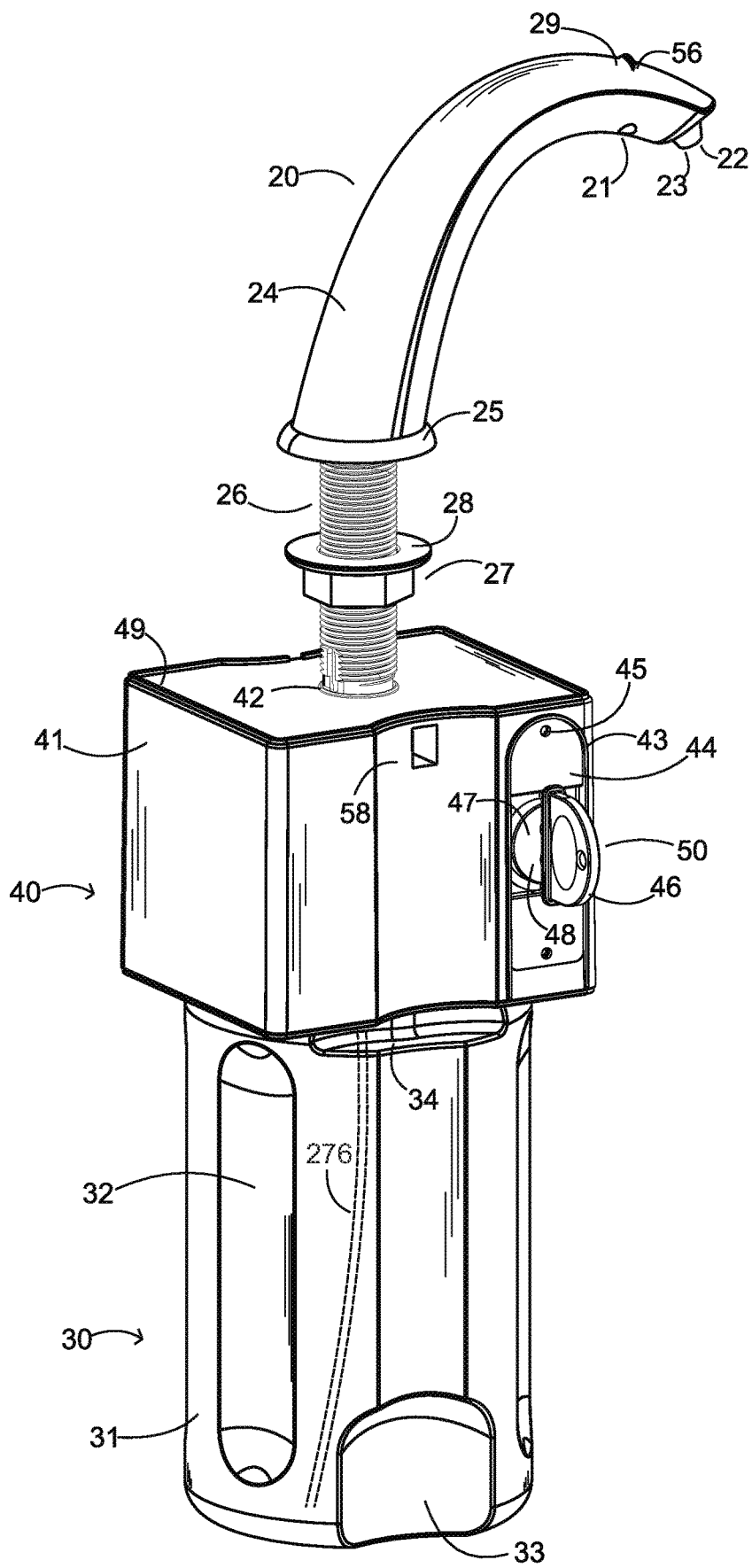
FIG. 1 is a perspective view.

The following call out list of elements can be a useful guide in referencing the elements of the drawings.

20 Spout
21 Spout Sensor
22 Spout Nozzle
23 Spout Nozzle Opening
24 Spout Extension
25 Spout Shoulder
26 Spout Mounting Shaft
27 Mounting Shaft Nut
28 Nut Flare
29 Forward Sensor
30 Bottle
31 Side Wall
32 Sidewall Indent Grip
33 Lower Depression
34 Upper Depression
35 Bottle Adapter
36 Adapter Protrusion
37 Adapter Port
38 Adapter Port Opening
39 Bottle Shoulder
40 Mixer Pump
41 Mixer Pump Housing
42 Pump Outlet Opening
43 Battery Door
44 Battery Tray
45 Tray Door Opening
46 Tray Door Key Handle
47 Tray Door Latch
48 Tray Door Latch Cam
49 Mixer Pump Housing Top Face
50 Tray Door Key
51 First Key Protrusion
52 Second Key Protrusion
53 First Latch Indent
54 Second Latch Indent
55 Key Handle Opening
56 Indicator
57 Mixer Housing Connector
58 Mixing Housing Connector Opening
59 Mixer Housing Connector Tab
60 Lower Port
61 Spout Extension Front Housing
62 Spout Extension Rear Housing
63 Sensor Bracket
64 Shoulder Gasket
65 Bottle Adapter Receiver Frame
66 Foam Screen
67 Motor
68 Motor Mount
69 Water Proof Gasket
70 Flow Control Fittings
71 Liquid Inlet Nozzle
72 Adapter Gasket
73 Battery
74 Battery Slots
75 Tray Opening
76 Circuit Board
77 Mounting Shaft Bracket
78 Spout Retainer Latch
79 Retainer Notch
80 Alignment System
81 Bottle Adapter Receiver
82 Bottle Adapter Receiver Sidewall
83 Bottle Adapter Intake Funnel
84 Bottle Adapter Retainer Bump
85 Adapter Sidewall
86 Adapter Hooks
87 Neck Groove
88 Rotation Stop
89 Bottle Adapter Retainer Slot
90 Bottle Neck
91 Upper Alignment Indent
92 Upper Alignment Edge
93 Lower Alignment Indent
94 Lower Alignment Edge
95 Liquid Inlet Nozzle Tubing Connector
100 Pump Assembly
101 Output Cover
102 Rubber Stopper
103 Filter Net
104 Piston Diaphragm
105 Piston Bracket
106 Piston Handle
107 Crank
108 Tailstock
109 Motor Housing
110 Motor Shaft
111 Motor Shaft Mounting Opening
112 Piston Handle Shaft Opening
113 Piston Handle Shaft
114 Piston Handle Arms
115 Piston Handle Diaphragm Engagement
116 Piston Diaphragm Tips
117 Piston Diaphragm Cups 118 Foam Outlet Port
119 Liquid Inlet Port
120 Air Inlet Port
121 Air Outlet Port
122 Mixer
123 first swivel socket circlip wrench tooth
124 second swivel socket circlip wrench tooth
125 wrench retaining gap
126 first mounting shaft nut retainer tooth
127 second mounting shaft nut retainer tooth
128 third mounting shaft nut retainer tooth
129 fourth mounting shaft nut retainer tooth
130 Swivel Socket Connector
131 First Swivel Hose
132 Second Swivel Hose
133 First Swivel Nipple
134 Second Swivel Nipple
135 Swivel Socket Circlip
136 Swivel Socket Flange
137 Upper Circlip Edge
138 Lower Circlip Edge
139 pump outlet opening flange
140 partition pump manifold
141 Air Conduit
142 Liquid Conduit
143 Air Partition
144 First Liquid Port
145 First Air Port
146 Second Air Port
147 Second Liquid Port
148 Liquid Partition
150 Mixing Socket
151 First Mixing Socket Nipple
152 Second Mixing Socket Nipple
153 Mixing Socket Body
154 Mixing Chamber Housing
155 Nozzle Mount
161 elastomeric seal
162 First Diaphragm Distal Air Opening
163 First Diaphragm Proximal Air Opening
164 Second Diaphragm Proximal Air Opening
165 Second Diaphragm Distal Air Opening
166 Third Diaphragm Distal Liquid Opening
167 Third Diaphragm Proximal Liquid Opening
181 Air Conduit Proximal Portion
182 Air Conduit Distal Portion
183 Liquid Conduit Proximal Portion
184 Liquid Conduit Distal Portion
191 First Diaphragm Cup
192 Second Diaphragm Cup
193 Third Diaphragm Cup
194 Adapter
200 Barrel
201 Barrel Lower Edge
202 Barrel Inside Edge
203 Barrel Inside Sidewall
204 Barrel Outer Edge
205 First Vertical Alignment Slot
206 Second Vertical Alignment Slot
207 Barrel Cavity
208 Minor Barrel Inside Sidewall
209 Barrel Socket
210 First Ramp
211 First Ramp Starting Edge
212 Major Barrel Inside Sidewall
213 First Ramp Lower Edge
214 Second Ramp
215 Second Ramp Starting Edge
216 Second Ramp Lower Edge
217 First Tube Socket
218 Second Tube Socket
219 First Tube Socket Conduit
220 Second Tube Socket Conduit
221 First Retaining Nub
222 Second Retaining Nub
223 Third Retaining Knob
224 Fourth Retaining Knob
225 Fifth Retaining Knob
226 Sixth Retaining Knob
227 Seventh Retaining Knob
228 Eighth Retaining Knob
229 Ninth Retaining Knob
230 Tenth Retaining Knob
231 Swivel Stop
232 Swivel Stop Right Face
233 Swivel Stop Left Face
240 Swivel Tip Assembly
241 Swivel Tip Base
242 First Alignment Pin
243 Second Alignment Pin
244 First Tube Extension Conduit
245 First Tube Extension Seal
246 Second Tube Extension Conduit
247 Second Tube Extension Seal
248 First Tube Extension
249 Second Tube Extension
250 Connection Shaft Tip
251 First Swivel Tip Slot
252 Second Swivel Tip Slot
253 Third Swivel Tip Slot
254 Fourth Swivel Tip Slot
255 Fifth Swivel Tip Slot
256 Six Swivel Tip Slot
257 Seventh Swivel Tip Slot
258 Eighth Swivel Tip Slot
259 Ninth Swivel Tip Slot
260 Tenth Swivel Tip Slot
261 Eleventh Swivel Tip Slot
262 Twelfth Swivel Tip Slot
270 Connection Shaft
271 Push Fit Collar
272 Swivel Tip Shaft
273 Push Fit Taper
274 First Flexible Tube
275 Second Flexible Tube
276 Bottle Tube
280 Mounting Shaft Nut External Thread
281 Mounting Shaft Nut Internal Thread
282 Sensor Cable
283 Sensor Cable Slot
284 Mounting Shaft Nut Lower Extension
285 Swivel Socket Circlip
286 Swivel Socket Circlip Lower Slot
287 Pump Outlet Slot
288 Lower Barrel Flange
289 Circlip Slot Ridge
290 Mounting Shaft Nut Retainer
291 Mounting Shaft Nut Lower End
292 Mounting Shaft Nut Upper End
300 Bottle Receiving Connection
301 Inlet Nozzle Tip First Conduit
302 Inlet Nozzle Tip Second Conduit
303 Inlet Nozzle Tip Third Conduit
304 Inlet Nozzle Tip Fourth Conduit 305 Inlet Nozzle Tip Fifth Conduit
306 Bottle Receiving Connection Socket Wall
307 Bottle Receiving Connection Socket
308 Bottle Receiving Connection Inside Wall Surface
309 Inlet Nozzle Tip
310 Bottle Receiving Socket Upper Wall
311 Bottle Adapter Receiver Frame Lower Surface
312 Bottle Adapter Receiver Frame Connectors
320 mounting shaft nut retainer gap
321 mounting shaft nut retainer tightening rotation
322 swivel socket circlip engagement translation
323 mounting shaft nut retainer engaging rotation
324 swivel socket circlip upper slot upper engagement surface
325 mounting shaft nut retainer upper surface
326 swivel socket circlip upper slot lower surface
327 pump outlet opening flange lower surface
328 swivel socket circlip lower slot lower surface
329 lower barrel flange lower surface
330 swivel socket circlip sidewall

DETAILED DESCRIPTION OF THE PREFERRED EMBODIMENT

As seen in FIG. 1, a spout 20 is configured to extend from a countertop by a spout extension 24 and dispense a flow of foam soap for a user. The spout 20 includes a spout sensor 21 which can be an infrared device or other type of proximity sensor. The spout sensor 21 is mounted to an underside of the spout 20. The spout nozzle 22 extends from a terminal tip of the spout 20. The spout nozzle 22 has a spout nozzle opening 23. The spout extension 24 has a lower end that forms a base. The spout shoulder 25 is configured to abut the countertop. Optionally, the spout 20 also preferably includes a forward sensor 29 that is directed forward and senses for the presence of a user. An indicator 56 can be mounted in an opening that receives the forward sensor 29 so that the user can see the operational status of the countertop dispenser.

A spout mounting shaft 26 extends downwardly from the spout extension 24. A mounting shaft nut 27 is threaded to the spout mounting shaft and has a nut flare 28 that contains a lower surface of the countertop underneath the countertop. The spout mounting shaft 26 extends downwardly to a pump outlet opening 42 to allow the spout mounting shaft 262 connected to the mixer pump 40.

The mixer pump 40 has a mixer pump housing 41 which includes the pump outlet housing 42. The mixer pump housing 41 includes a battery door 43 attached to a battery tray 44. The tray door opening 45 is formed on the battery door 43 and is configured to receive a connector such as a security screw that retains the battery tray door 43. The tray door has a tray door latch 47 actuated by a tray door latch cam 48. The tray door latch cam 48 has a slot for receiving a tray door key. The tray door key 50 as a tray door key handle 46 that when turned can actuate the tray door latch cam 48. The tray door key 50 has a security engagement to the tray door latch cam 48, such as by a pair of nonstandard prongs. The mixer pump housing 41 also includes a mixing housing connector opening 58 that shape to receive a security screw. The mixing housing connector opening 58 allows a connector to retain together a pair of sections of the mixer pump housing 41 such as the 49 mixer pump housing top face and the lower portion of the mixer pump housing.

The bottle 30 is connected to an underside of the mixer pump housing 41. The bottle 30 has a sidewall 31 with a sidewall indent grip 32 that improves structural rigidity. The bottle 30 has a lower depression 33 and an upper depression 34 also to improve structural rigidity. The bottle 30 includes a bottle tube 276 which extends downwardly from the top of the bottle.

Figure 2:
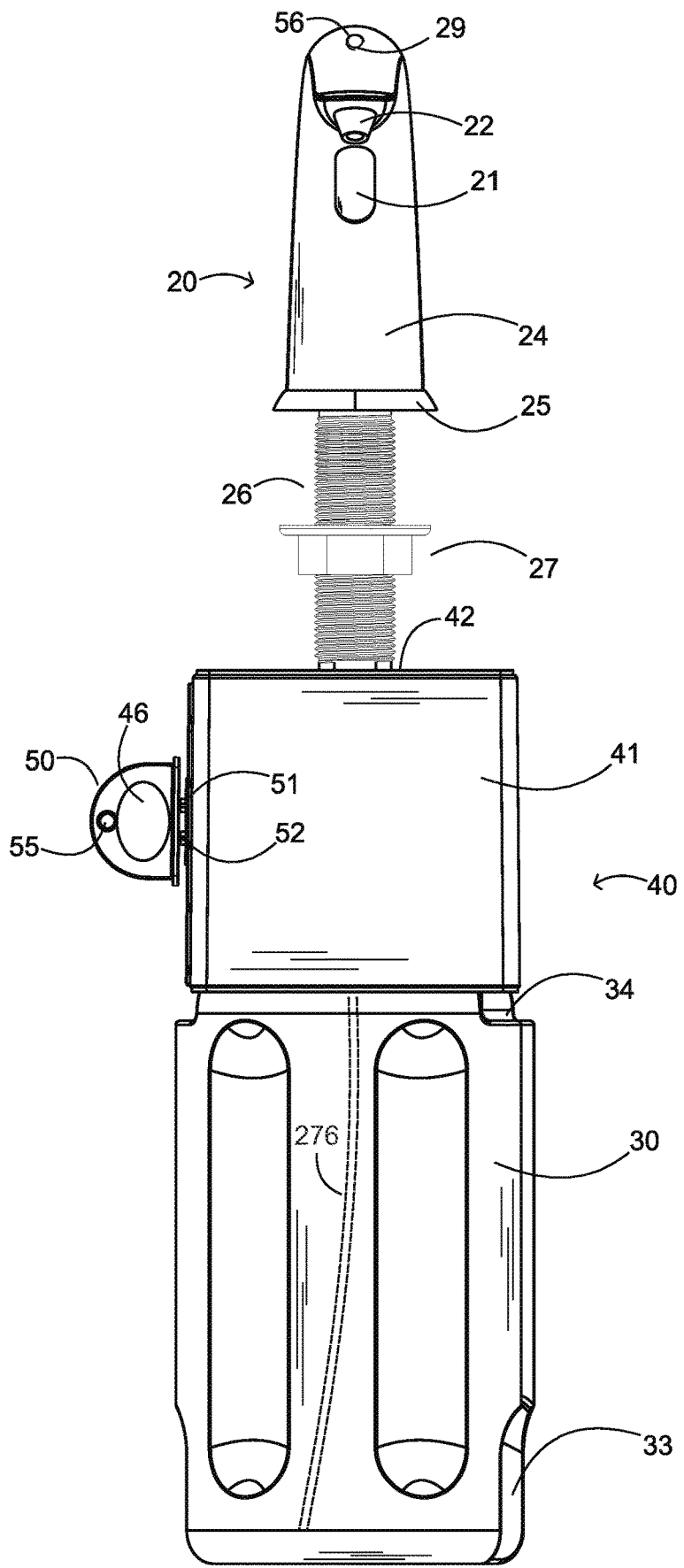
FIG. 2 is a front view.

As seen in FIG. 2, the spout 20 has a forward facing spout sensor 21 that is pill shaped and elongated. The spout sensor 21 has a lens providing a continuous flush external surface with the spout 20. The spout nozzle 22 is a frustroconical protrusion extending downward from the spout 20. The spout extension 24 is generally centered to the spout mounting shaft 26 and the spout shoulder 25. The mounting shaft nut 27 can be made of metal or plastic and configured to rotate and tighten onto a mounting opening formed in the countertop. The forward sensor 29 is mounted inside the spout 20 and also has a flush lens that allows the forward sensor 29 to detect the presence of a user. The forward sensor 29 can work in conjunction with the spout sensor 21 so that the spout only activates when both sensors sense a presence. The spout sensor 21 senses the presence of the user's hands, and the forward sensor 29 senses the presence of a user's torso. The indicator 56 can be mounted in the same opening as the forward sensor 29.

The tray door key handle 46 is preferably rounded. The 50 tray door key may have a first key protrusion 51 and a second key protrusion 52. A key handle opening 55 may allow connection to a lanyard or other line. The pair of key protrusion, namely the first key protrusion 51 and the second key protrusion 52 are required to allow the turning of the tray door latch cam 48.

Figure 3:
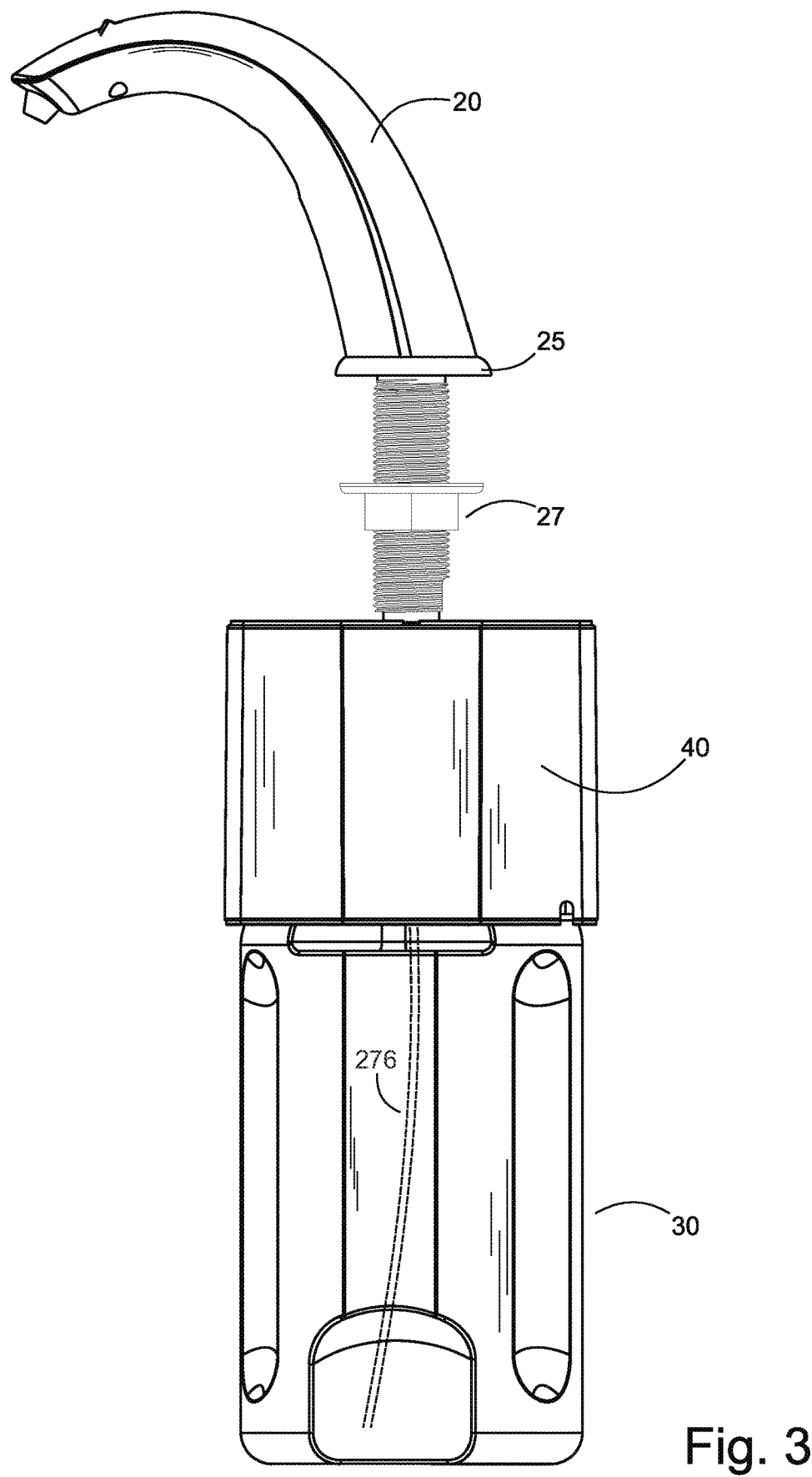
FIG. 3 is a right side view.

As seen in FIG. 3, the spout 20 can have a curved profile that extends at an angle from the spout shoulder 25. The mounting shaft nut 27 is preferably hexagonal. The bottle 30 mounts to the mixer pump in a single action.

Figure 4:
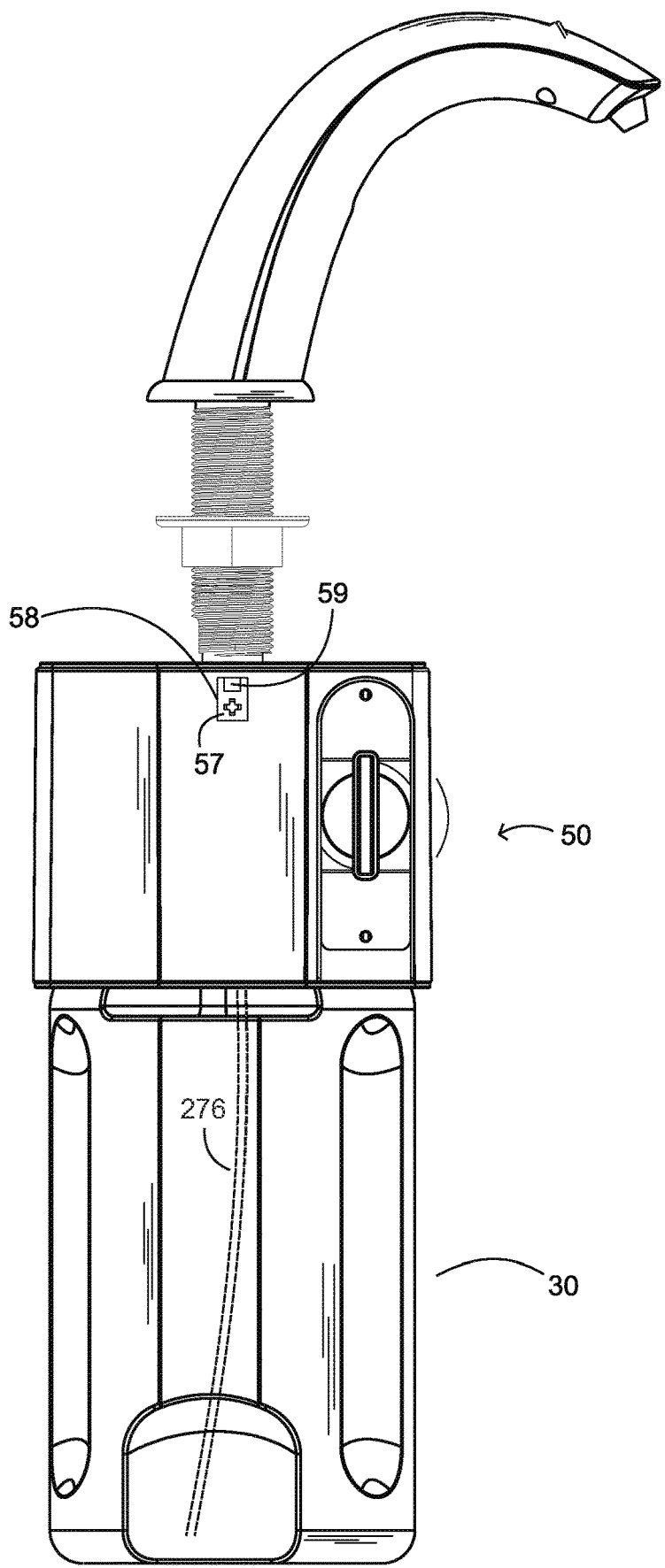
FIG. 4 is a left side view.

As seen in FIG. 4, the tray door key 50 allows access to the battery tray and is next to the mixer housing connector 57. The mixer housing connector 57 preferably includes a mixer housing connector opening 58 and may have mixer housing connector tab 59. The mixer housing connector tab 59 can be formed as a latch that has a snap connection between the different parts of the mixer housing.

Figure 5:
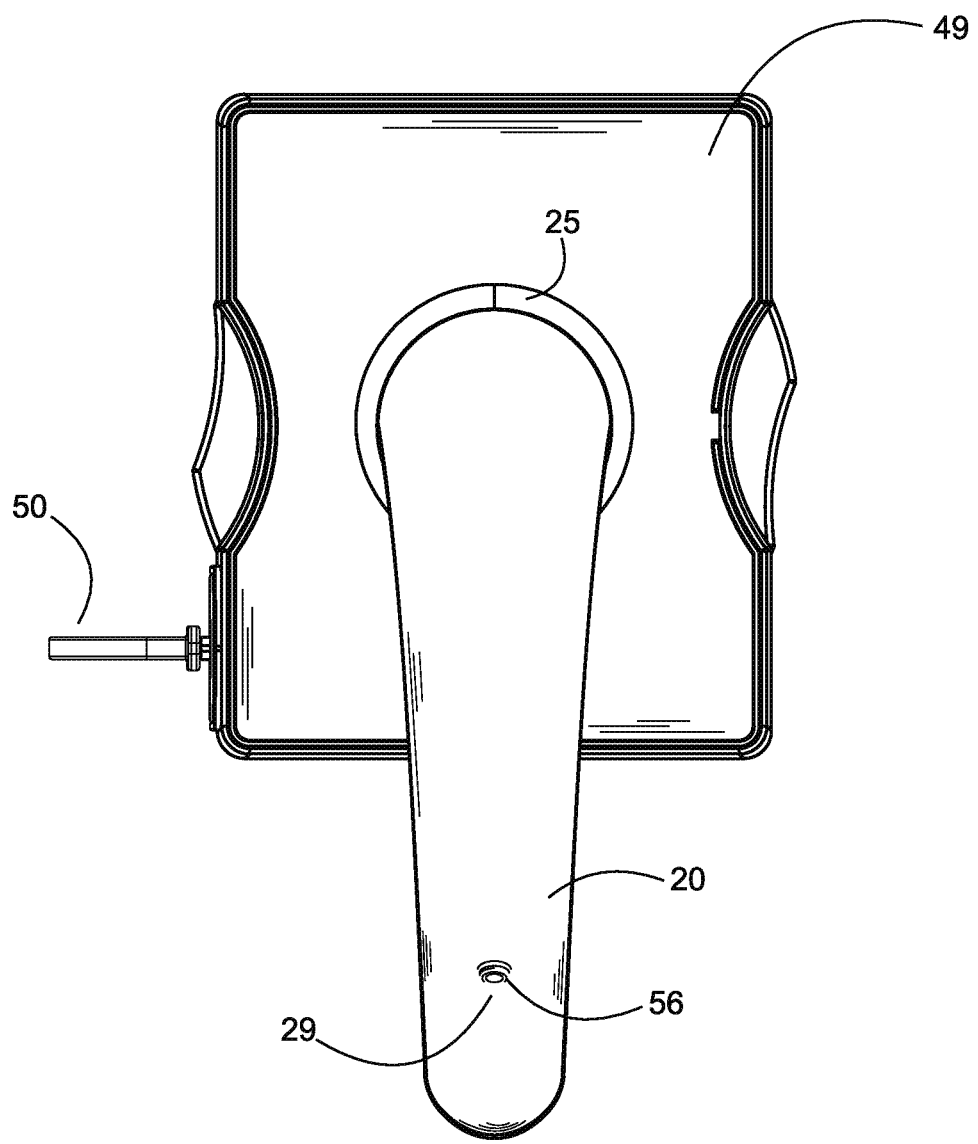
FIG. 5 is a top view.

As seen in FIG. 5, the spout 20 extends forward, and the spout shoulder 25 can form a seal with the countertop. The forward sensor 29 is perpendicular to the extension of the spout. The mixer pump housing top face 49 is preferably rectangular. The tray door key 50 can extend laterally from the left side of the mixer pump housing. The indicator 56 is also disposed forwardly to provide an indication to the user.

Figure 6:
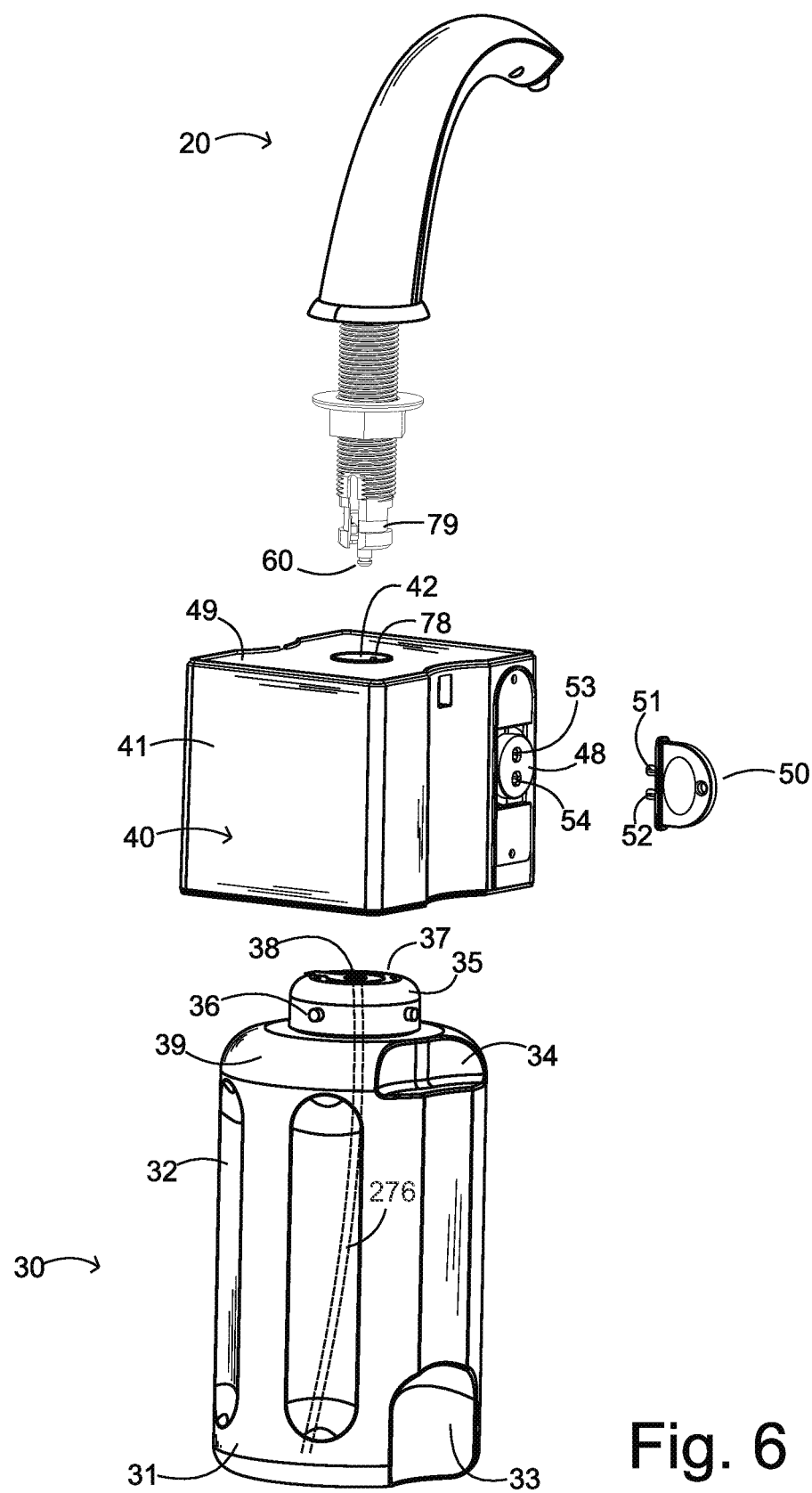
FIG. 6 is an exploded view.

As seen in FIG. 6, the spout 20 may have a lower port 60 with an annular relief that allows installation of an elastomeric ring seal. The mixer housing connector tab 59 can release a spout retainer latch 78 in the pump outlet opening 42 so as to release the lower port 60 of the spout 20. The spout retainer latch 78 may retain the lower port 60 at a retainer notch 79. The spout retainer latch 78 preferably allows a snap connection of the spout 20 to the pump outlet opening 42. In this way, a user can first mount the spout 20 using the nut in a first step and then in a second step snap on the spout retainer latch 78 to the retainer notch 79 thereby engaging the pump outlet opening 42 the spout 20 in a pair of separate steps.

The user can attach the bottle 30 after attaching the pump outlet opening 42 to the lower port 60. The user grasps the sidewall 31 of the bottle 30 by a variety of sidewall indent grips 32. The user may also use the lower depression 33 or the upper depression 34. The bottle 30 has a bottle adapter 35 mounted above a bottle shoulder 39. The bottle adapter 35 snaps to the neck of the bottle and creates a watertight permanent seal to the bottle. The bottle adapter 35 preferably has four adapter protrusions 36 that are oriented at 90° from each other and extend away from a vertical sidewall of the bottle adapter 35. The bottle adapter 35 has an adapter port 37 with an adapter port opening 38. The adapter port opening 38 connects to the bottle tube 276 which extends downwardly from the top of the bottle adapter port opening 38 at the top of the bottle 30.

The mixer pump 40 mixes water and air inside the mixer pump housing 41. The resulting foam soap is expelled through the pump outlet opening 42 and through the spout 20. The tray door latch cam 48 has a pair of depressions that receive a pair of protrusions of the tray door key 50. The tray door key 50 has a first key protrusion 51 and a second key protrusion 52. The tray door latch cam 48 has a first latch indent 53 and a second latch indent 54 that receive the pair of protrusion of the tray door key 50. When both protrusions insert into both depressions, the latch can be turned to unlock the battery tray door. The battery tray door and battery compartment is preferably watertight.

Figure 7:
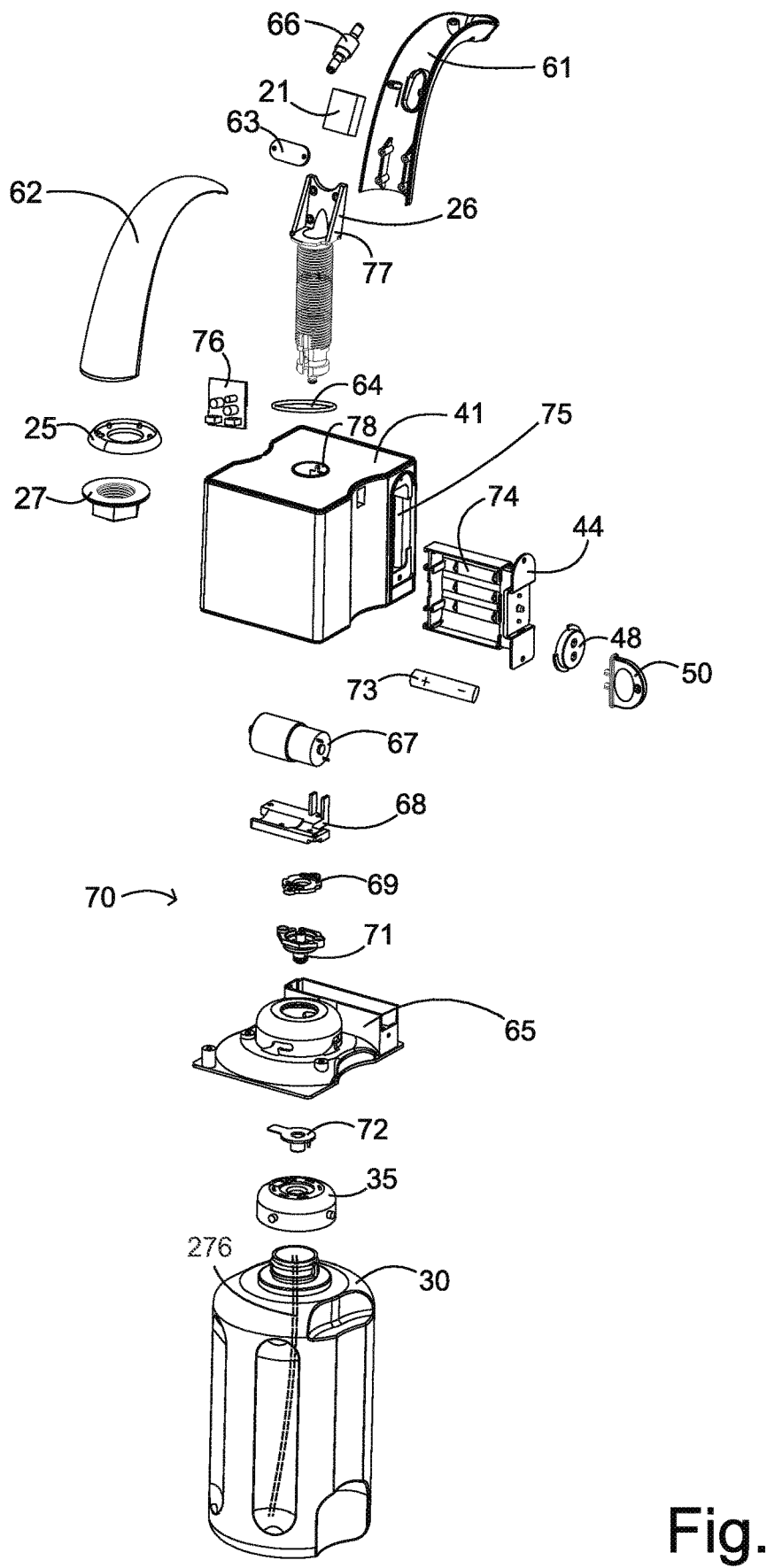
FIG. 7 is a detailed exploded view.
Figure 8:
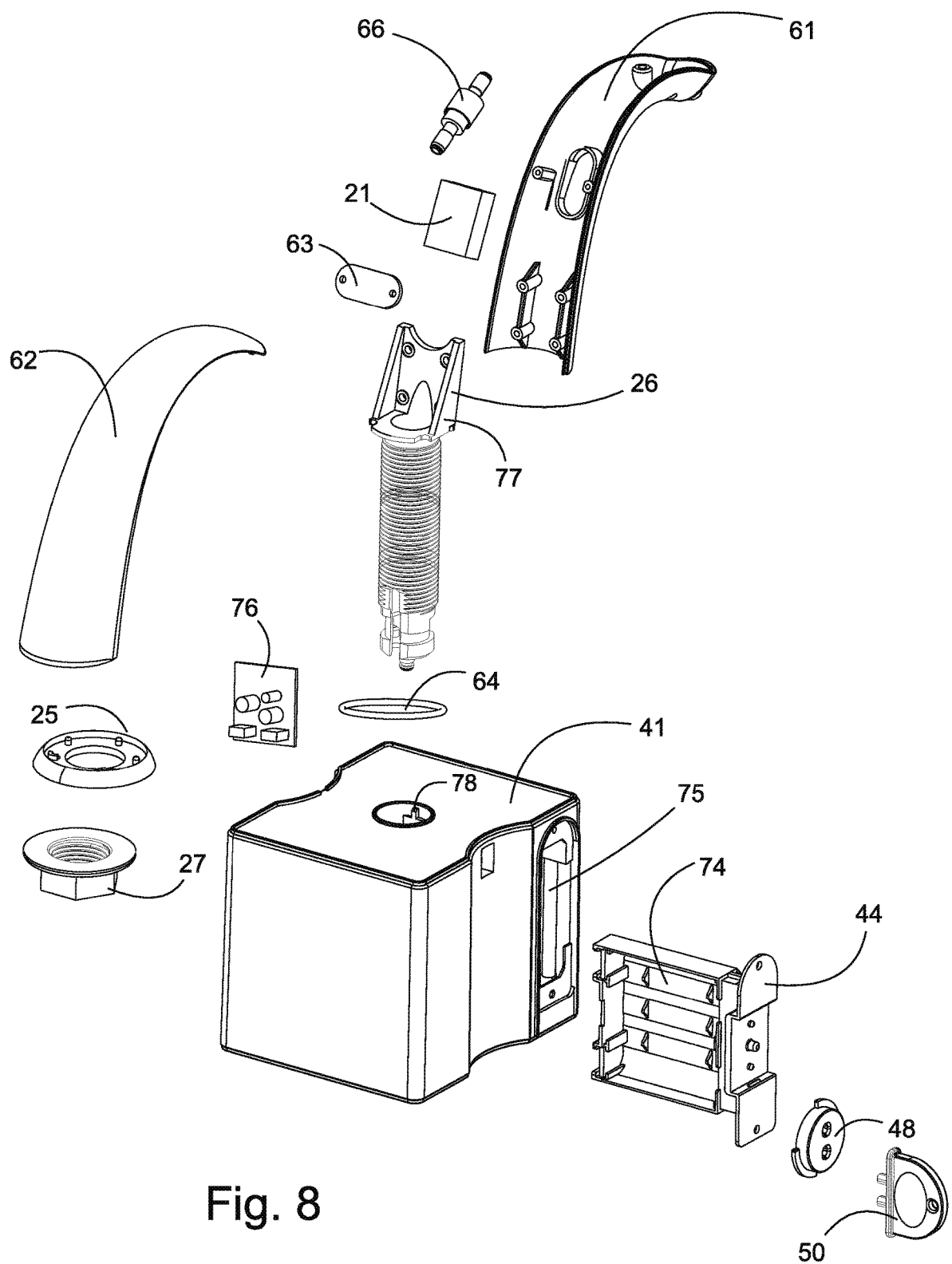
FIG. 8 is an enlarged detailed exploded view of the upper portion of FIG. 7.

As seen in FIG. 7, a variety of internal components reside within the various housings. The spout sensor 21 is mounted between a spout extension front housing 61 and a spout extension rear housing 62. A sensor bracket 63 can mount on mounting posts of the spout extension front housing 61 and thus retain the spout sensor 21 to the spout extension front housing 61. Similarly, a foam screen 66 can remix rough foam into finer foam and can be mounted in the cavity between the spout extension front housing 1 and the spout extension rear housing 62. The spout shoulder 25 can retain the lower semicircular edges of the pair of spout extension housings. The spout mounting shaft 26 has a mounting shaft bracket 77 that secures to the spout extension front housing 61. A shoulder gasket 64 can seal the spout shoulder 25.

The bottle 30 holds soap in liquid form and receives a bottle adapter 35. The liquid soap travels upwardly from the bottle tube 276. The bottle adapter 35 adapts to an adapter gasket 72. The adapter gasket 72 secures to a bottle adapter receiver frame 65 formed as a lower portion of the mixer pump housing 41. The bottle adapter receiver also forms a lower portion of the battery tray slot and may define a portion of the tray opening 75. The battery tray 44 receives batteries 73 in battery slots 74 and is secured by the tray door latch cam 48 with the tray door key 50. The battery system powers a circuit board 76.

The battery powers a motor 67 that is mounted to a motor mount 68. A variety of flow control fittings 70 prevents leaks while allowing single-handed quick connection. A water proof gasket 69 made of an elastomeric material seals a liquid inlet nozzle 71. The liquid inlet nozzle 71 is mounted to the bottle adapter receiver frame 65 and sealed against the adapter gasket.

Figure 9:
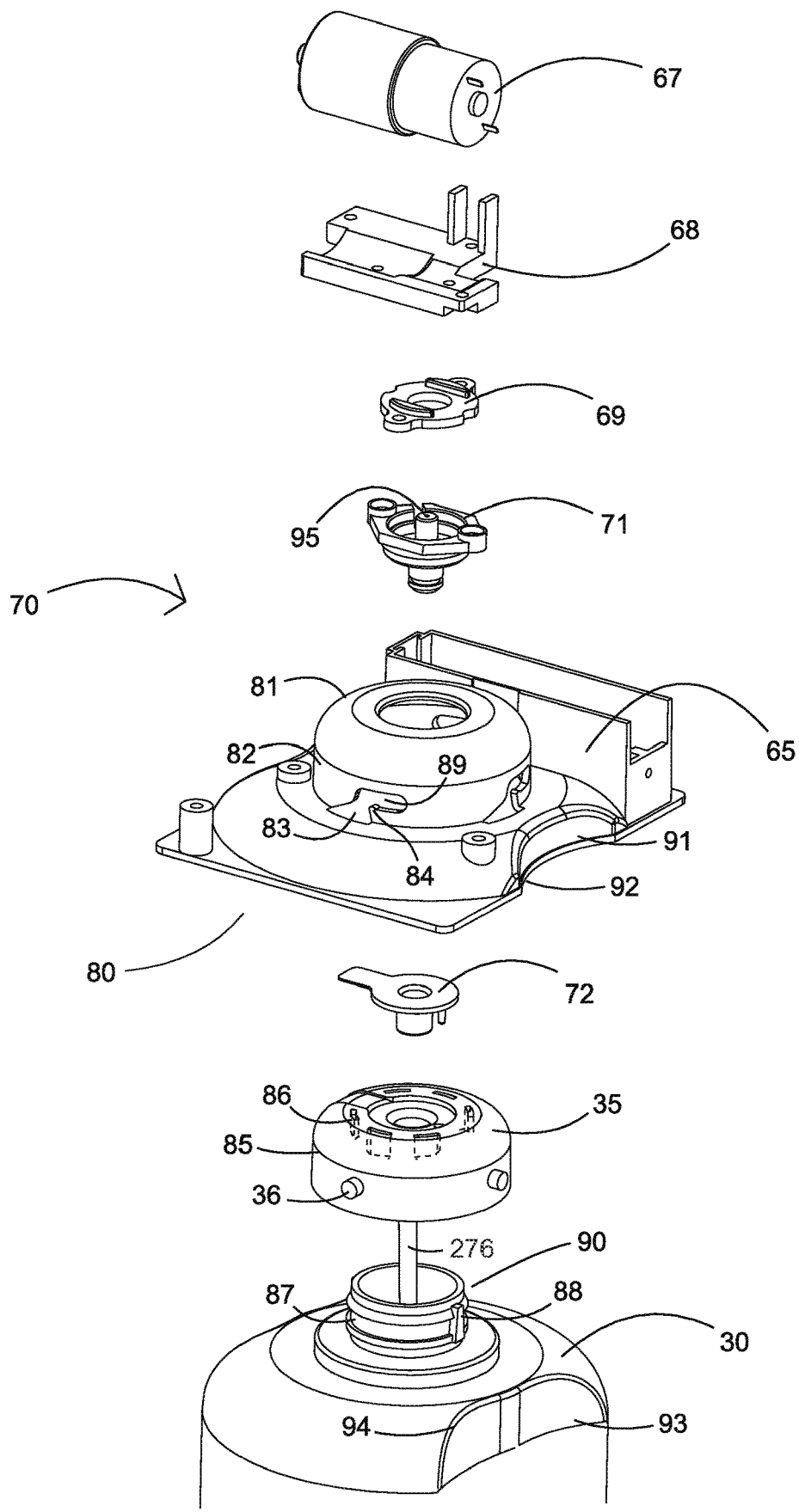
FIG. 9 is an enlarged detailed exploded view of the lower portion of FIG. 7.

As seen in FIG. 9, an alignment system 80 includes indents and slots for retaining the bottle 30 at the bottle neck 90. The bottle adapter receiver 81 is a hollow indented portion of the bottle adapter receiver frame 65, and is shaped to receive the bottle adapter 35. The adapter protrusion 36 engage to the bottle adapter receiver sidewall 82. The adapter protrusions 36 have a circular cylindrical profile that extend horizontally away from the bottle adapter. The adapter protrusions 36 engage a bottle adapter intake funnel 83 and rotate clockwise to pass over a bottle adapter retainer bump 84. The bottle adapter intake funnel 83 and the bottle adapter retainer bump 84 are formed on the bottle adapter retainer slot 89. The bottle adapter retainer slot 89 is formed on the bottle adapter receiver sidewall 82.

The alignment system 80 also includes an alignment for the bottle. The bottle adapter 35 has an adapter sidewall 85. The bottle adapter 35 has downwardly protruding adapter hooks 86. The adapter hooks 86 engage to a neck groove 87 formed on a neck of the bottle. A rotation stop 88 breaks the continuity of the neck grooves 87 so that the adapter hooks 86 will abut the rotation stop 88 when the adapter protrusions 36 are engaged to the bottle adapter retainer bump 84. As liquid is drawn upward from the bottle 30, air intake is entrained within the flow of liquid to make rough foam. As the rough foam travels upward, it can pass through additional screening or mixing to screen into finer foam. Liquid soap is drawn through the bottle tube 276 which is attached to the adapter sidewall 85.

Preferably, an upper alignment indent 91 formed on the bottle adapter receiver frame 65 has an upper alignment edge 92. The upper alignment edge 92 aligned with a lower alignment edge 94. The lower alignment edge 94 is formed on a lower alignment indent 93 which is disposed on the bottle 30. The pair of aligning alignment edges allows a user to uninstall and install the bottle from the bottle adapter receiver frame 65 without direct line of sight, using only touch. The upper alignment indent 91 holds the lower alignment indent 93 so that the inside surface of the upper alignment indent 91 abuts the outside surface of the lower alignment indent 93. Thus, the alignment indents key the bottle to the bottle adapter receiver 81. The bottle adapter receiver 81 only receives the bottle that has the matching alignment indent. The alignment indent on the bottle is formed on the bottle shoulder. The bottle shoulder may be slightly flexible for allowing it to rotate into the bottle adapter receiver 81 where the pair of alignment indents engage.

Figure 10:
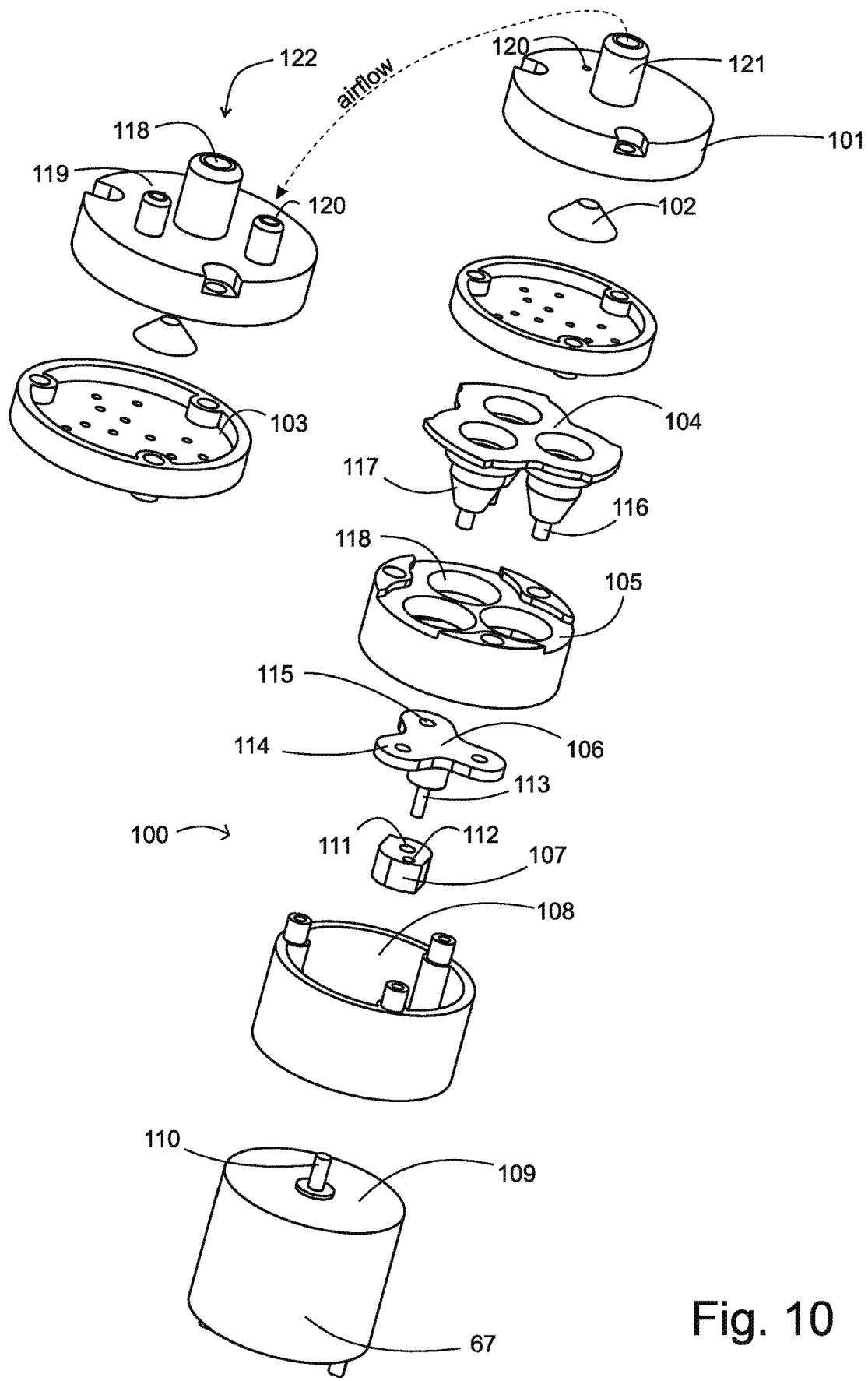
FIG. 10 is an exploded view of the pump and mixer assemblies.

As seen in FIG. 10, the motor 67 is part of a pump assembly 100. The motor 67 has a motor housing 109 and a motor shaft 110 extending from the motor housing 109. The motor shaft 110 extends into a tailstock 108. The tailstock 108 is a housing that holds a crank 107 and a piston handle. The crank 107 has a motor shaft mounting opening 111. The motor shaft mounting opening 111 is offset from a piston handle shaft opening 112. The crank 107 has a piston handle shaft opening 112 that retains a piston handle shaft 113. The piston handle shaft 113 wobbles cyclically about the motor shaft 110 and has an angle to the motor shaft 110. The piston handle 106 has three extending piston handle arms 114. Each of the piston handle arms have a piston handle diaphragm engagement 115. The piston handle diaphragm engagement 115 engages the piston diagram 104 at piston diaphragm tips 116. The piston diaphragm tips 116 are connected to an integrally formed with piston diaphragm cups 117. The piston diaphragm cups can be cylinder or cone shaped and fit into piston bracket recesses of the piston bracket 105. As the piston handle shaft 113 rotates, it sequentially depresses piston handle diaphragm engagements 115, which in turn sequentially depress piston diaphragm tips 116, thereby sequentially decreasing a volume of the piston diaphragm cups 117. The piston diaphragm 104 has a flat portion that seals on of the piston bracket 105, so that the piston diaphragm 104 does not rotate relative to the piston bracket 105. The piston bracket 105 also does not rotate relative to the tailstock 108 as the piston bracket 105 is secured to the tailstock 108 by connectors such as screws.

A filter net 103 in a mixer 122 can screen liquid to create rough foam output from the mixer 122. The mixer is separated from the pump area by some distance to prevent backflow of foam into the motor. The output nozzle cover 101 has an air inlet port 120 and an air outlet port 121.

The air generation is used to power and airflow and the airflow enters a mixer 122 where it mixes with liquid soap to create a rough foam via a screen. A rubber stopper 102 can selectively cyclically allow and control admittance of air. The liquid inlet port 119 is connected to the bottle. The rubber stopper 102 can act as a one-way valve, and also the air inlet port 120 preferably includes a one-way valve so as to prevent leakage. The air inlet port 120 can have a one-way valve installed such as by a plastic sheet, a ball stop, or other type of cyclically engaging seal. No liquid should enter the pump area, and is restricted to only the mixer area. The liquid is likely to leak around the piston diaphragm 104 and destroy the motor should liquid enter the output cover 101. Therefore, it is imperative to maintain the dry condition of the output cover 101. It is preferred that the pump is connected to the mixer by a plastic tubing or otherwise segregated by a one-way flow valve. A foam outlet port 118 expels generated foam created from aspirated air through the air inlet port 120 and the liquid inlet port 119 in the mixer. It is a feature of the present invention to separate the membrane pump area from the foam mixing area so as to increase longevity of the electromechanical components.

The plastic tubing connecting the components in the present invention is not shown in the drawings for purposes of clarity since the appropriate connections are obvious. For example, components such as the liquid inlet nozzle 71 preferably have a liquid inlet nozzle tubing connector 95 which can be connected by tubing to the liquid inlet port 119.

Figure 11:
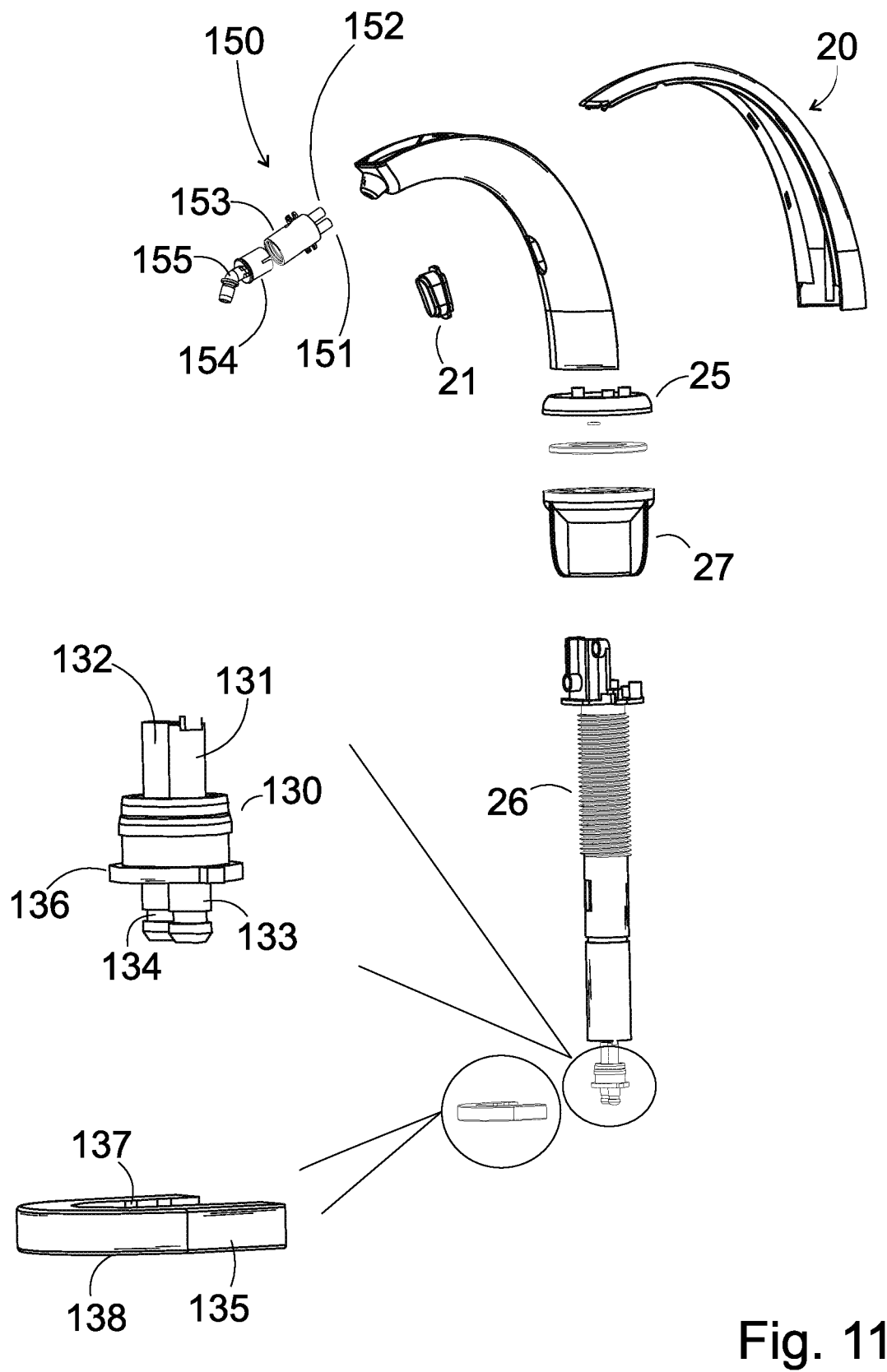
FIG. 11 an exploded view of the present invention.

As seen FIG. 11, the spout 20 may have a spout sensor 21 that is formed on the sidewall of the spout 20. The spout 20 may further receive a spout shoulder 25 that is secured to a spout mounting shaft 26 having an external threaded surface that receives a mounting shaft nut 27. The lower end of the spout mounting shaft 26 has a swivel socket connector 130, which includes a connection to a first swivel hose 131 and a second swivel hose 132. The first swivel hose 131 is in fluid communication with the first swivel nipple 133. The first swivel nipple 133 connects to tubing exiting the pump. The second swivel nipple 134 is in fluid communication with the second swivel hose 132. A swivel socket circlip 135 makes a connection to the swivel socket flange 136 on the swivel socket connector 130. The swivel socket flange 136 is preferably formed as a protrusion extending laterally from cylindrical sidewall of the swivel socket connector 130. The lower circlip edge 138 engages the pump outlet opening flange 139 of FIG. 12 that is formed on the pump outlet opening 42. The upper circlip edge 137 engages the swivel socket flange 136. The swivel socket circlip 135 biases the pump outlet opening flange 139 towards the swivel socket flange 136.

The mixing socket 150 is located at the spout 20 and has a pair of connections where the first mixing socket nipple 151 is connected to the first swivel hose 131 and the second mixing socket nipple 152 is connected to the second swivel hose 132. The mixing socket 150 has a mixing socket body 153 with a cylindrical barrel housing with protruding anchors that engage to the body of the spout 20. The mixing chamber housing 154 can be inserted in the cartridge into the hollow socket of the mixing socket body 153. The mixing chamber housing 14 screens and mixes the liquid and air to form fine foam. A nozzle mount 155 is connected to the mixing chamber housing 154, which inserts into the mixing socket body 153.

Figure 12:
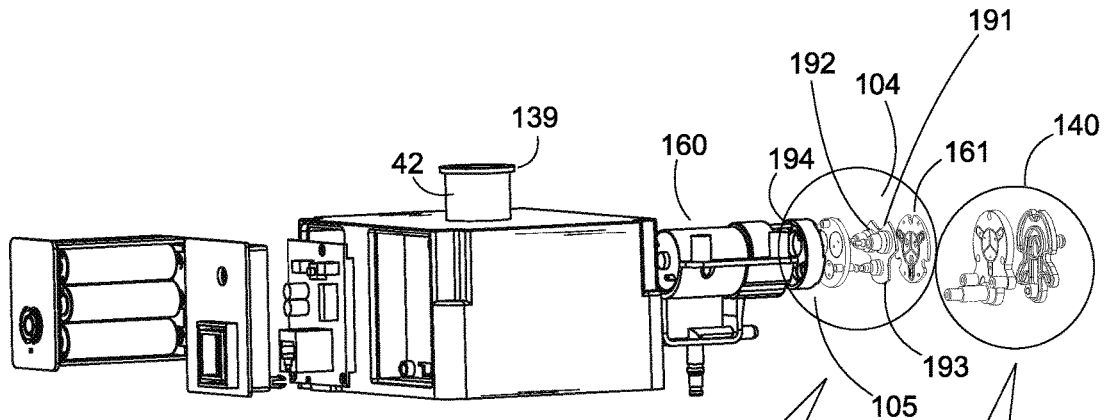
FIG. 12 is an exploded view of the pump.

As seen in FIG. 12, the pump outlet opening 42 has a pump outlet opening flange 139. The pump 160 pumps both liquid and air. The piston diaphragm 104 has two air diaphragms and one liquid diaphragm, which are separated from each other by the piston diaphragm seal 161 so that they operate independently. The pump 160 includes a piston bracket 105 that retains the piston diaphragm 104, piston diaphragm seal 161 and the partition pump manifold 140. The piston diaphragm cups 117 preferably include three cups, a first diaphragm cup 191, a second diaphragm cup 192, and the third diaphragm cup 193.

Figure 13:
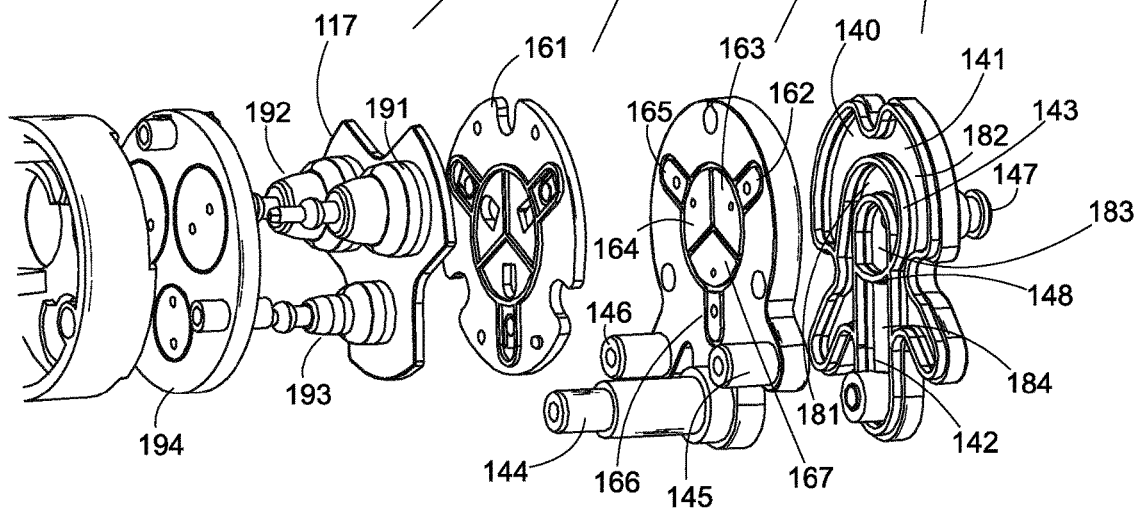
FIG. 13 is an enlarged exploded view of the pump.

As seen in FIG. 13, the partition pump manifold 140 can be formed of a pair of plastic injection molded housings or shells that fit together to form internal conduit passages. An air conduit 141 has an air conduit proximal portion 181, and an air conduit distal portion 182. Similarly, the liquid conduit 142 has a liquid conduit proximal portion 183 and a liquid conduit distal portion 184. The air conduit proximal portion 181 is separated from the air conduit distal portion 182 by the air partition 143. The air partition 143 extends to a liquid partition 148, which separates the liquid conduit proximal portion 183 from the liquid conduit distal portion 184.

The first liquid port 144 is in fluid communication with the second liquid port 147 such that liquid is pumped from the first liquid port 144 to the second liquid 147, or liquid can be pumped from the second liquid port to the first liquid port. The first liquid port is connected to the liquid conduit distal portion 184 of the liquid conduit 142, and the second liquid port 147 is connected to the liquid conduit proximal portion 183. A reciprocating diaphragm pumps the liquid from the liquid conduit distal portion 184 to the liquid conduit proximal portion 183, or pump the liquid from the liquid conduit proximal portion 183 to the liquid conduit distal portion 184. Reciprocating diaphragm Similarly, the first air port 145 is in fluid communication with the second air port 146 so that air is pumped from the first air port 145 to the second air port 146, or from the second air port 146 to the first air port 145. The liquid and air hoses can connect to the ports. The first diaphragm distal air opening 162 passes to the air conduit distal portion 182 and the first diaphragm proximal air opening 163 passes to the air conduit proximal portion 181. The first diaphragm exchanges air between the first diaphragm distal opening 162 and the first diaphragm proximal opening 163. The second diaphragm exchanges air between the second diaphragm proximal air opening 164 and the second diaphragm distal air opening 165. The second diaphragm proximal air opening 164 connects to the air conduit proximal portion 181, and the second diaphragm distal air opening 165 connects the air conduit distal portion 182. The openings can receive a one-way valve or seal 161 that allows air or liquid to pass in a particular direction. The seal 161 can also be integrally formed as a gasket having an elastomeric material composition. The seal 161 can be an intermittent seal that seals air or liquid from passing through a particular opening in a particular direction. If the seal 161 is formed as a plastic flap on a sheet that blocks the first diaphragm proximal air opening 163, the decrease in volume of the third piston of the piston diaphragm 104 would push air through the first diaphragm distal air opening 162. A subsequent increase in volume of the third piston of the piston diaphragm would draw air through the first diaphragm proximal air opening 163 by separating the plastic flap from the opening to allow a gap for airflow. Instead of a plastic flap, the intermittent valves could be implemented as ball bearings or other means.

The third diaphragm of the piston diaphragm seal 104 pumps liquid between the third diaphragm distal liquid opening 166 and the third diaphragm proximal liquid opening 167. The third diaphragm distal liquid opening 156 is connected to the liquid conduit distal portion 184, and third diaphragm proximal liquid opening 167 is connected to the liquid conduit proximal portion 183. Optionally, an adapter 194 can adapt the cup openings to the seal 161 when mounted the cup openings and the seal.

Note that the adapter 194 is shown in FIG. 13 as the pump housing and the piston diaphragm cups, however this is only for showing that the alignment of the circular seals of the piston diaphragm cups 117 align to the circular seals on the adapter 194. The adapter 194 when installed is actually on the backside of the piston diaphragm cups 117 so that the circular seals of the adapter 194 are aligned to the backside of the piston diaphragm cups 117 to adapt the piston diaphragm cups 117 to the elastomeric seal 161. The piston diaphragm cups 117 are preferably soft and the adapter 194 is preferably rigid. The elastomeric seal 161 is preferably soft and the manifold is preferably a rigid item. Thus, the hard and soft items alternate to provide an improved seal in a sandwich like fashion.

Figure 14:
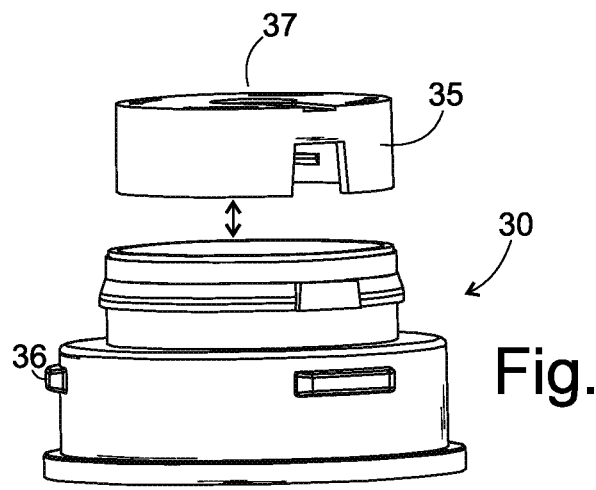
FIG. 14 is an enlarged exploded view of a cap connected to an upper portion of the bottle.
Figure 15:
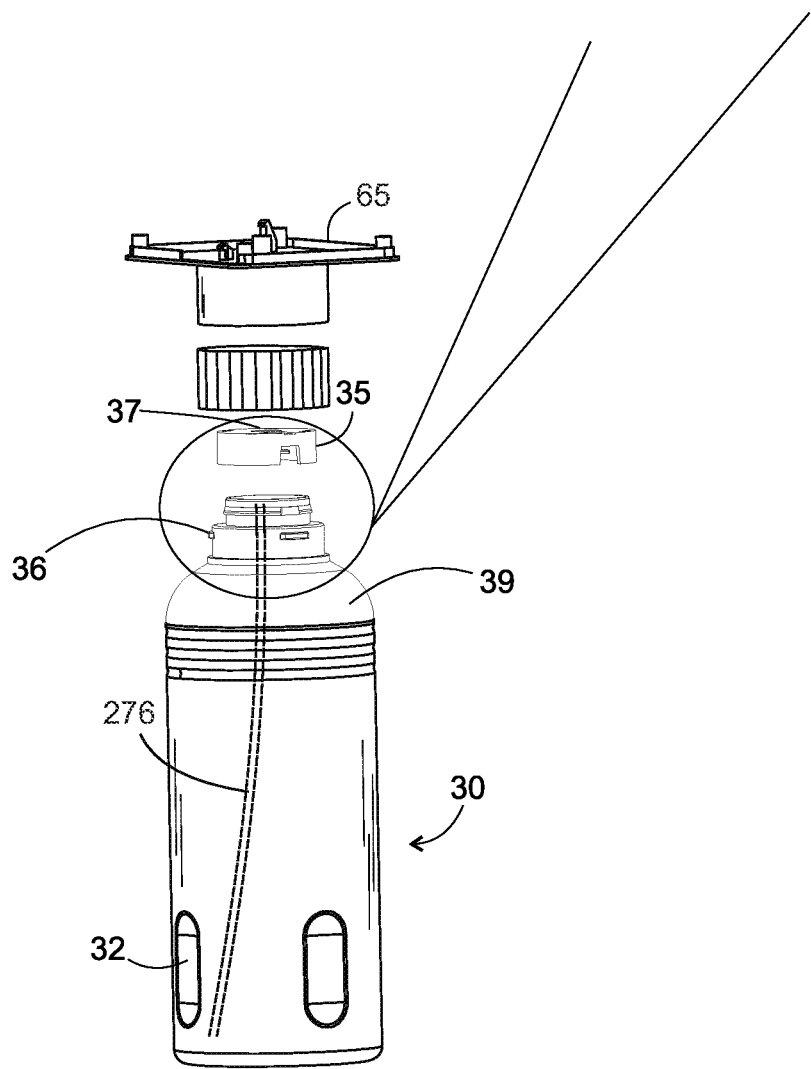
FIG. 15 is an enlarged exploded view of the entire bottle.

As seen in FIG. 14, a bottle 30 has a bottle adapter 35 having an adapter port 37, but the adapter protrusion 36 is formed on the neck of the bottle 30. As seen in FIG. 15, the bottle 30 has a sidewall indent grip 32 that allows the grip for engaging the adapter protrusion 36 formed on the neck of the bottle 30. The adapter protrusion 36 can be formed as lug or locking protrusion that retains the bottle and the bottle adapter 35 to the housing. The adapter port 37 bottle shoulder 39 narrows to a narrow neck.

Thus, the key point of the present invention is that the pump provides a measured output, namely one pulse of liquid, then two pulses of air in a rapid cyclical sequence. The rotary arrangement of the diaphragm cups allows a motor with a rotating shaft to actuate the diaphragm cups in a clockwise or counterclockwise direction, which provides a discrete control over the output. This improves the dosage measurement and thus output consistency while still providing an improved life due to segregation of the liquid from air within the pump. Also, a single motor can provide a synchronized air and liquid dispensing. It is preferred that the liquid diaphragm cup, shown as the third diaphragm cup, is smaller than each of the two air diaphragm cups, shown as the first and second diaphragm cups. The pump outputs a separate stream of liquid and air in a parallel pair of tubes that connect from the air conduit 141 and the liquid conduit 142. The separate streams have a flow with discrete and measured quantity and proportion.

Figure 16:
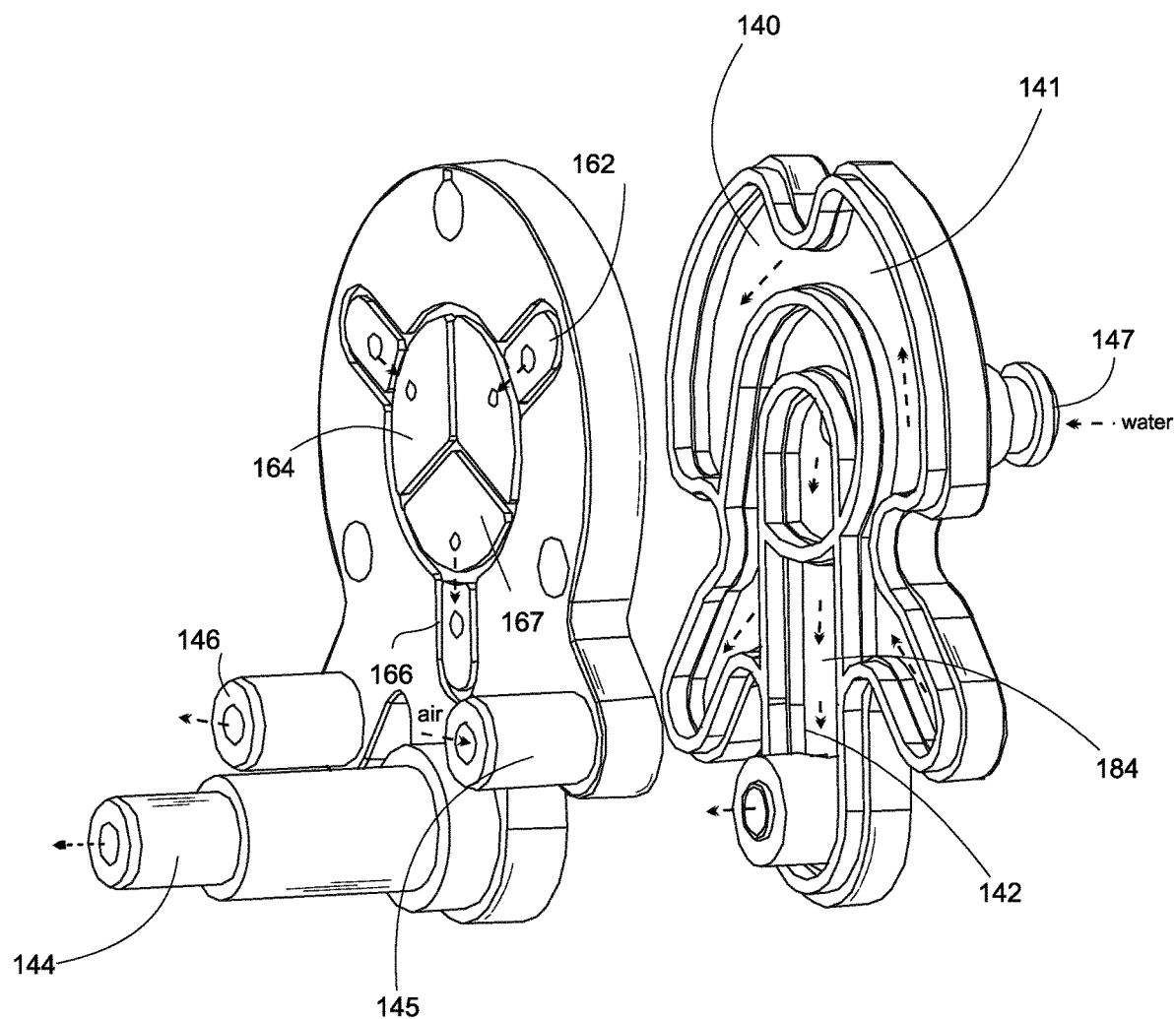
FIG. 16 is an enlarged view showing liquid and airflow through conduits and ports of the manifold.
Figure 17:
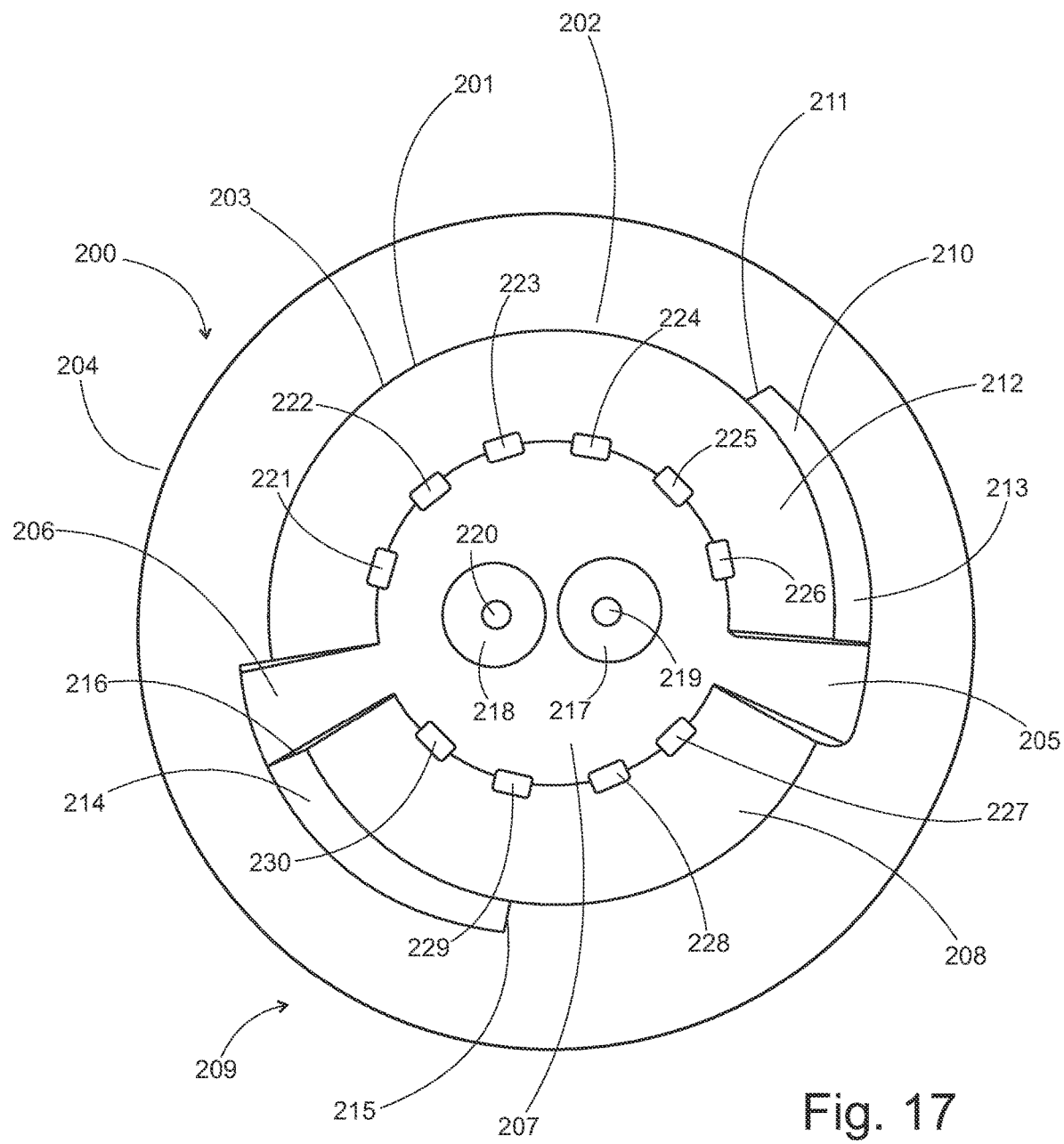
FIG. 17 is a top view of the barrel cavity.

FIG. 16 shows airflow and liquid flow within the conduits with different style arrows.

As seen in FIGS. 17-21, the stem of the spout has a lower end which has a swivel connection. The lower end of the stem has a barrel 200. The barrel 200 is formed as a tube and has a barrel inside sidewall 203 at a barrel inside edge 202. The barrel lower edge 201 is recessed, while the barrel inside edge 202 is flush to the barrel 200. The barrel outer edge 204 and the barrel inside edge 202 define a tubular shape. At the barrel inside edge 202, a first vertical alignment slot 205 and a second vertical alignment slot 206 extend inwardly into the barrel cavity 207. The barrel inside sidewall 203 has a minor barrel inside sidewall 208 and a major barrel inside sidewall 212 that are segmented at the first vertical alignment slot 205 and the second vertical alignment slot 206. The minor barrel inside sidewall 208 has less surface area than the major barrel inside sidewall 212.

The first ramp 210 begins at a first ramp starting edge 211 at the barrel inside edge 202. The first ramp 210 extends downwardly in a spiral to a first ramp lower edge 213 at the first vertical alignment slot 205. Similarly, the second ramp starting edge 215 defines a starting position of the second ramp 214. The second ramp 214 ends at a second ramp lower edge 216 where the second ramp lower edge 216 meets the second vertical alignment slot 206. The second ramp 214 also has a spiral shape and is in the same handed orientation as the first ramp 210.

The first retaining nub 221, the second retaining nub 222, the third retaining nub 223, the fourth retaining nub, the fifth retaining nub 225, and the sixth retaining nub 226 extend from the major barrel inside sidewall 212 and extend from the barrel cavity 207. Similarly, the seventh retaining nub 227, the eighth retaining nub 228, the ninth retaining nub 229, and the tenth retaining nub 230 extend outwardly from the minor barrel inside sidewall 208 and extend outwardly from the barrel cavity 207. The barrel cavity has an inside surface with a first tube socket 217 and a second tube socket 218. The first tube socket receives a first tube, and the second tube socket receives a second tube.

Figure 18:
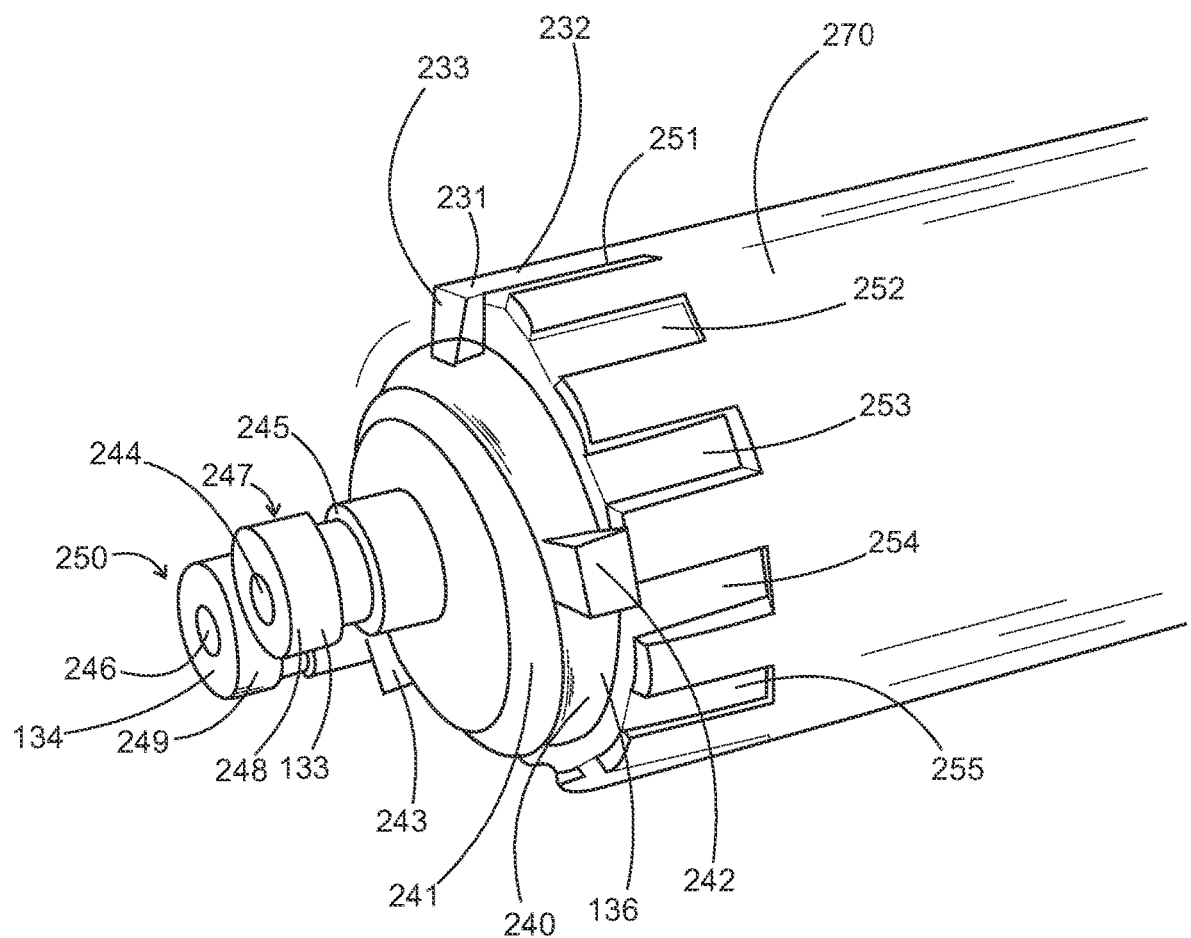
FIG. 18 is a perspective view of the shaft connection tip on the connection shaft.
Figure 19:
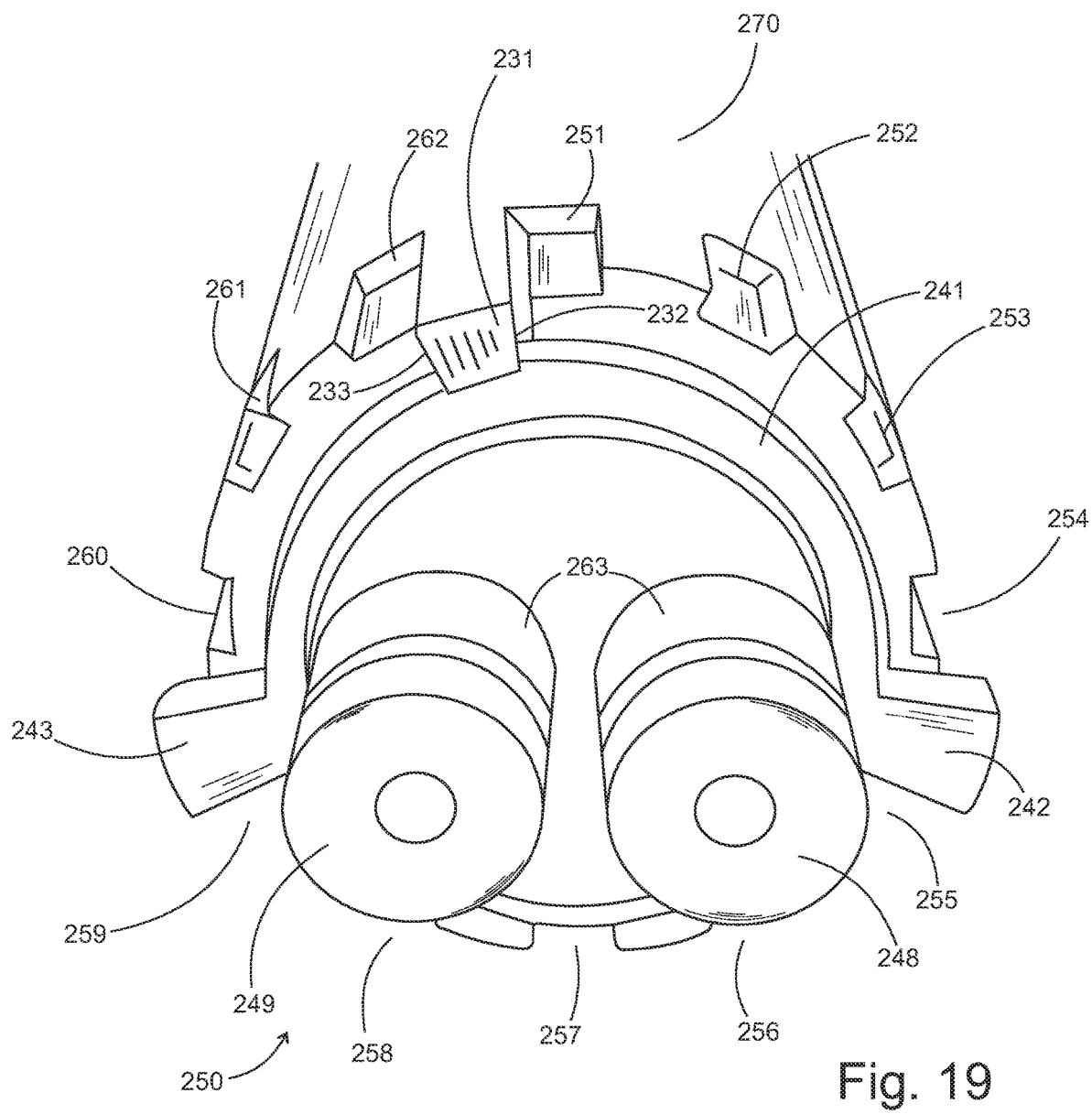
FIG. 19 is a close-up view of the shaft connection tip.
Figure 20:
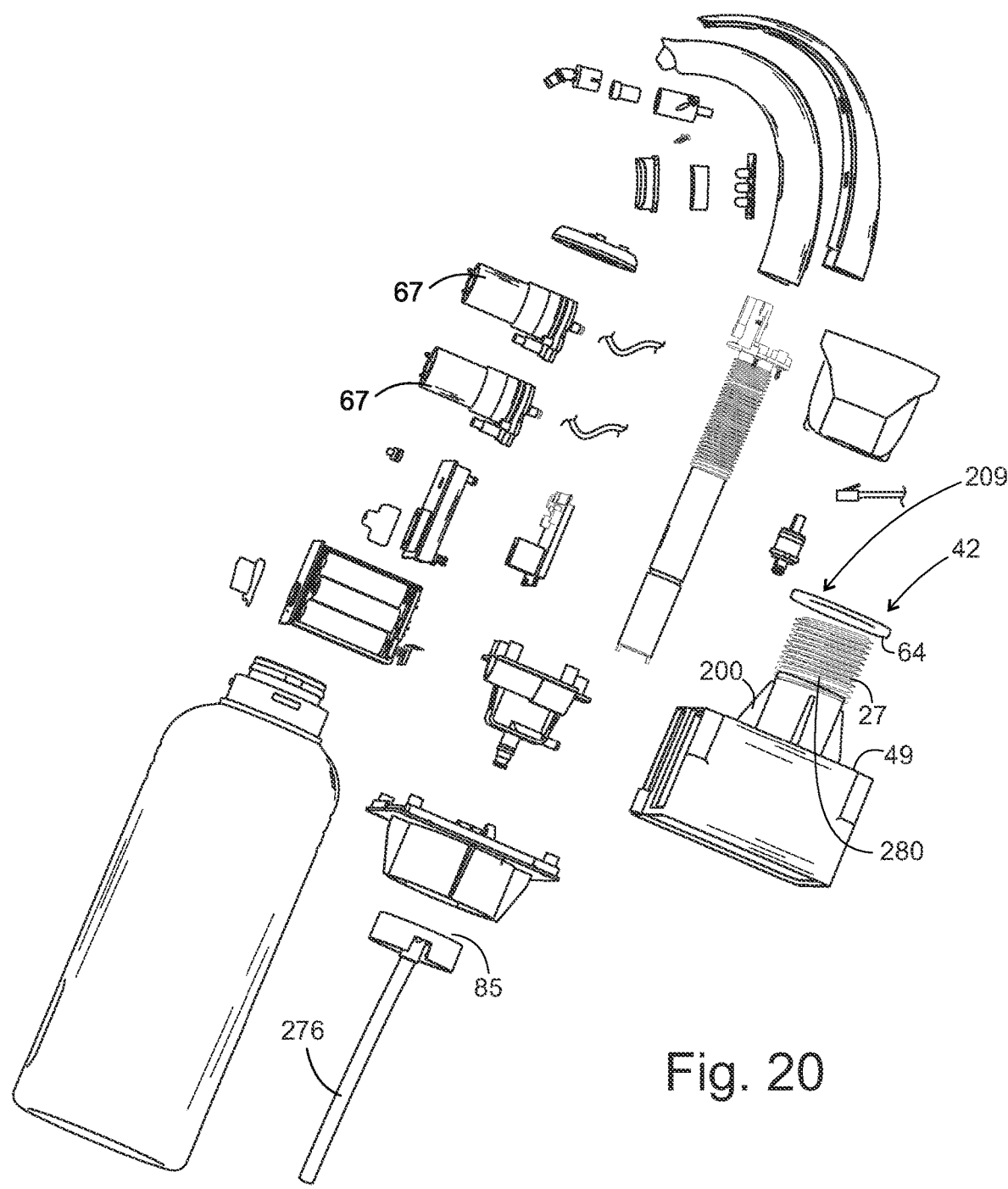
FIG. 20 is an enlarged exploded view diagram of the present invention.

As seen in FIG. 18, the first tube extension 248 inserts into the first tube socket 217 and the second tube extension 249 inserts into the second tube socket 218. The first tube extension seal 245 and the second tube extension seal 247 can be formed as O-rings that fit into grooves on the first tube extension 248 and the second tube extension 229. The first shaft and the second shaft have a connection shaft tip 250 that engages the sockets. The first conduit 219 and second conduit 220 extend from the first tube socket 217 and the second tube socket 218 through the first tube extension 248 and the second tube extension 249.

The swivel tip slots receive the retaining nubs. There are ten nubs and twelve slots. If the first retaining nub 221 fits with the first swivel tip slot 251, then the second retaining nub 222 engages the second swivel tip slot 252. The third retaining nub 223 engages and inserts into the third swivel tip slot 253. The fourth retaining nub 224 extends and inserts into the fourth swivel tip slot 254. The fifth retaining nub 225 inserts and engages to the fifth swivel tip slot 255. The sixth retaining nub 226 inserts and engages to the sixth swivel tip slot 256. However, the seventh retaining nub 227 inserts into the eighth swivel tip slot 258 because the first vertical alignment slot 205 doesn't have a nub on it. The seventh swivel tip slot would not receive a nub because it would be adjacent to and aligned to the first vertical alignment slot 205. The eighth retaining nub 228 inserts into the ninth swivel tip slot 259. The ninth retaining nub 229 engages the tenth swivel tip slot 260. The tenth retaining nub 230 engages the eleventh swivel tip slot 261. The twelfth swivel tip slot does not engage in any nub because it is aligned to the second vertical alignment slot 206. Optionally, the vertical alignment slots could receive nubs so that each nub would be received in each slot, although that is not the best mode.

Optionally, a swivel stop 231 between the first swivel tip slot 251 and the tenth swivel tip slot 260 limits rotation to less than 180° where the second alignment pin 243 and the first alignment pin 242 abut the swivel stop 231. The first alignment pin engages the first ramp 210, and the second alignment pin 243 engages the second ramp 214. The first alignment pin 242 can be a segment of a circle to match the shape of the vertical alignment slot. As the first alignment pin 242 and the second alignment and 243 engage the pair of slots, the swivel base 241 rotates relative to the connecting shaft 270. The first extension tube 248 and the second extension tube 249 is thus automatically engage the first tube socket 217 and the second tube socket 218. The angular length of the first ramp can be approximately 45°, and the angular length of the second ramp can also be approximately 45°. The connection shaft tip 250 thus rotates relative to the connection shaft 270. The connection shaft 270 is sized to engage the barrel inside sidewall 203 which has a slightly larger diameter than the connection shaft 270 diameter.

The swivel extensions 263 extend upwardly from the swivel base 241 and can be integrally formed with the swivel base 241. Similarly, the swivel stop 231 can be integrally formed with the connection shaft 270 and the swivel tip slots. The barrel socket 209 extends upwardly to a barrel cavity 207. The connection does not require visual confirmation. When a user pushes the connection shaft tip upwardly, the user will feel that the first alignment pin 242 engage the ramp or the first vertical alignment slot and the second alignment pin 243 engage the ramp or the second vertical alignment slot.

The connection shaft tip 250 thus provides a first swivel nipple 133 extending beyond the first tube extension seal 245, and a second swivel nipple 134 extending beyond the second tube extension seal 247. The connection shaft tip 250 may also have a swivel socket flange 136. The swivel socket flange can have an extending first alignment pin 242 and a second alignment pin 243. The swivel socket flange 136 is preferably rigidly formed with the alignment pins. The alignment pins extend outwardly away from each other but not at 180°. The swivel base 241 may have a swivel socket flange 136. The swivel base 241 connects to a pair of tubes that pass through the connection shaft 270. The second tube extension conduit 246 has a rigid portion at the second swivel nipple 134, and then can connect to a soft elastomeric tubing such as polyethylene tubing that can rotate or twist. The polyethylene tubing is held within the connection shaft 270 in a loose configuration with slack so that it can rotate with the swivel base 241.

Figure 21:
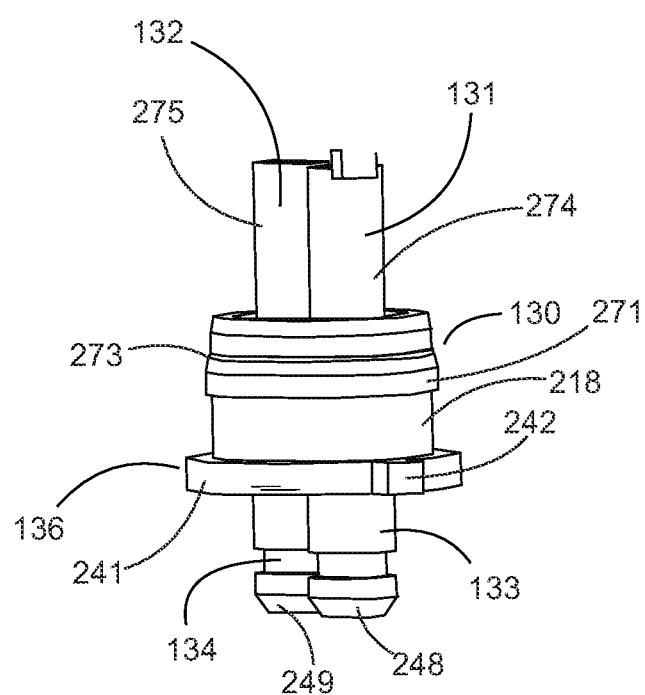
FIG. 21 is a close-up view of the swivel tip portion of the connection shaft.

As seen in FIG. 21, the first flexible tube 274 and the second flexible tube 275 fit onto the swivel tip shaft 272 having a push fit taper 273. The push fit taper 273 fits to the connection shaft 270 in a swivel connection. The swivel tip base 241 includes the first alignment pin 242 and the second alignment pin. The swivel tip base 241 is rigidly formed with the swivel tip shaft 272, and push fit taper 273. The flexible tubes have some slack so that they can twist up to 180 degrees inside of the connection shaft 270.

Figure 22:
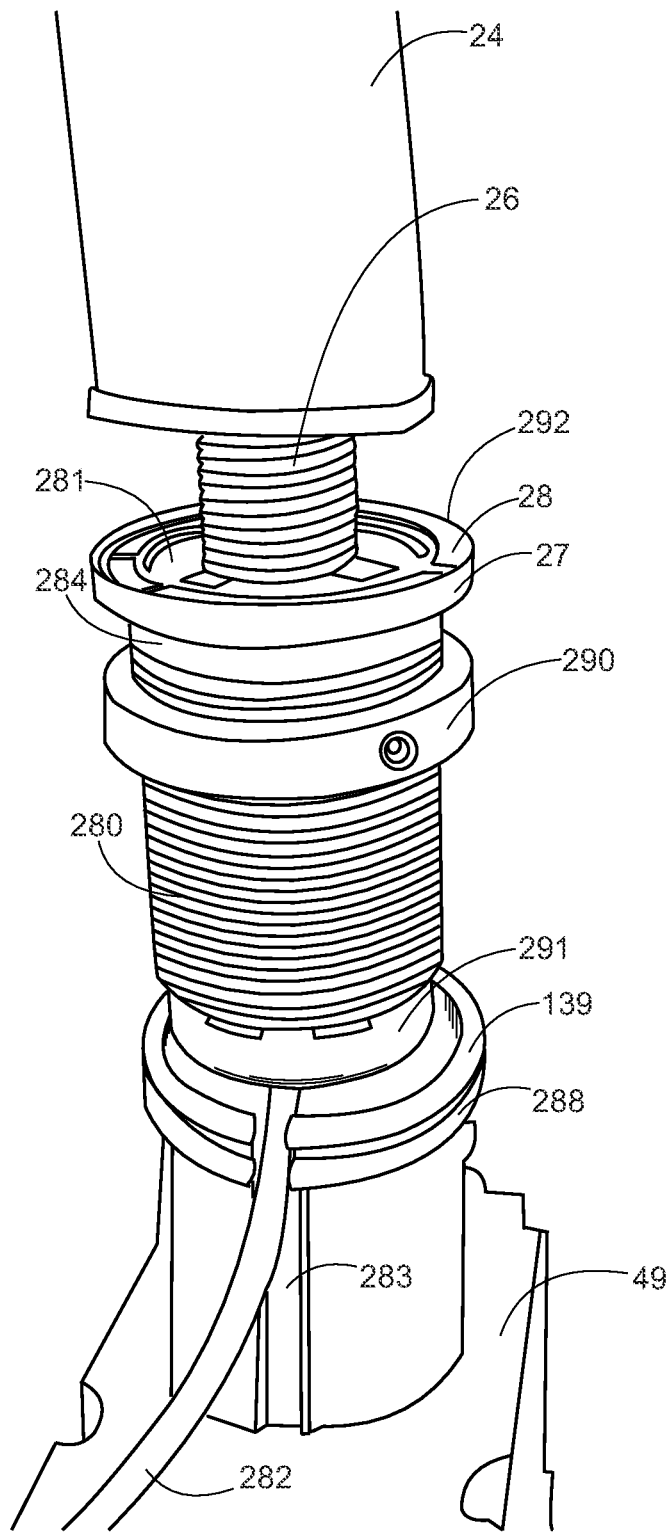
FIG. 22 is an exploded view of the spout assembly connection.

As seen in FIG. 22, the spout extension 24 has a spout mounting shaft 26 with an external thread that engages the mounting shaft nut internal thread 281 formed on the mounting shaft nut upper end 292 which is located at an upper portion of the mounting shaft nut 27. A mounting shaft nut lower extension 284 extends downwardly from the mounting shaft nut upper end 292. The mounting shaft nut lower extension 284 is preferably threaded to receive a mounting shaft nut retainer 290. As the mounting shaft nut 27 rotates around the spout mounting shaft 26, the mounting shaft nut retainer 290 rotates around the mounting shaft nut 27. The mounting shaft nut retainer 290 rotates on the external threaded portion of the mounting shaft nut lower extension 284 so that it lowers to abut the pump outlet opening flange 139. The lower barrel flange 288 is formed below the pump outlet opening flange 139 and is preferably symmetrical to the pump outlet opening flange 139. The sensor cable 282 passes through a sensor cable slot 283 and then enters into the spout mounting shaft 26 at the mounting shaft nut lower end 291.

Figure 23:
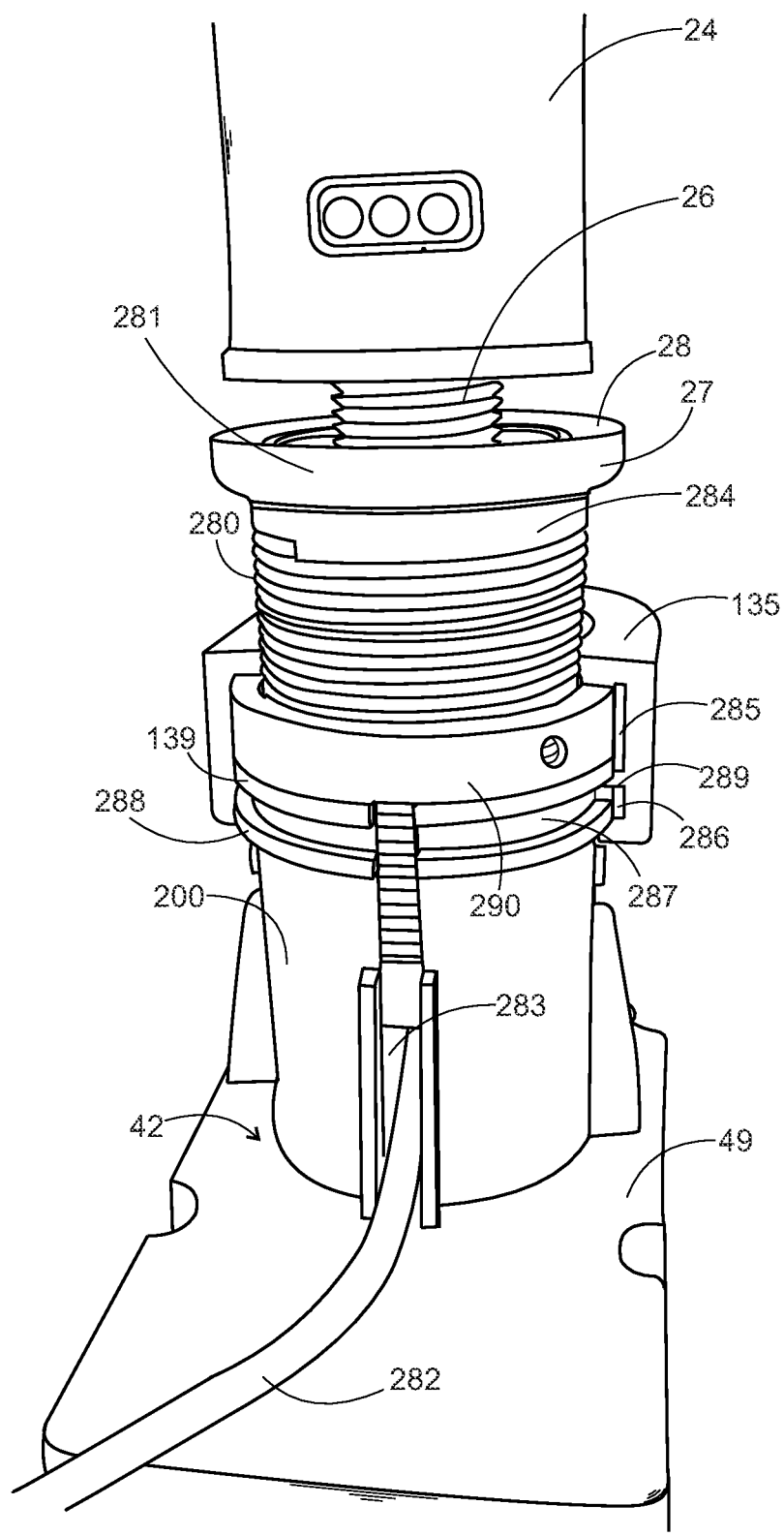
FIG. 23 a partially assembled view of the spout assembly connection.

As seen in FIG. 23, the assembly of the spout extension 24 to the mixer pump housing top face 49 is more complete. The barrel 200 forms the pump outlet opening 42 on the mixer pump housing top face 49. The mounting shaft nut lower extension 284 has a mounting shaft nut external thread 280 that receives the mounting shaft nut retainer 290.

The swivel socket circlip 135 is installed to the mounting shaft nut retainer 290. The swivel socket circlip 135 has a swivel socket circlip upper slot 285, and a swivel socket circlip lower slot 286. A circlip slot ridge 289 protrudes between the swivel socket circlip upper slot 285 and the swivel socket circlip lower slot 286. The swivel socket circlip upper slot 285 clamps the mounting shaft nut retainer 290 to the pump outlet opening flange 139 and the lower barrel flange 288 by clipping them together within the swivel socket circlip upper slot 285. The barrel 200 has a pump outlet opening flange 139 and a lower barrel flange 288 with a pump outlet opening slot 287 formed between them. The pump outlet opening slot 287 receives the circlip slot ridge 289, and the swivel socket circlip lower slot 286 receives the lower barrel flange 288.

The user first puts the spout extension 24 in the countertop on an upper surface of the countertop. Then the user rotates and tightens the mounting shaft nut 27 to the lower surface of the countertop. With the spout extension 24 secured to the countertop, the user then orients the barrel 200 facing upward. Then, the user pushes the spout extension 24 into the pump outlet opening 42. The spout extension 24 makes a fluid connection with the pump outlet opening 42. The user then rotates the mounting shaft nut retainer 290 until it touches the pump outlet opening flange 139. Then the user installs the swivel socket circlip 135 by sliding it over the mounting shaft nut retainer 290 and pump outlet opening flange 139. The swivel socket circlip 135 is strong enough to retain the entire lower portion of the mixer pump.

Figure 24:
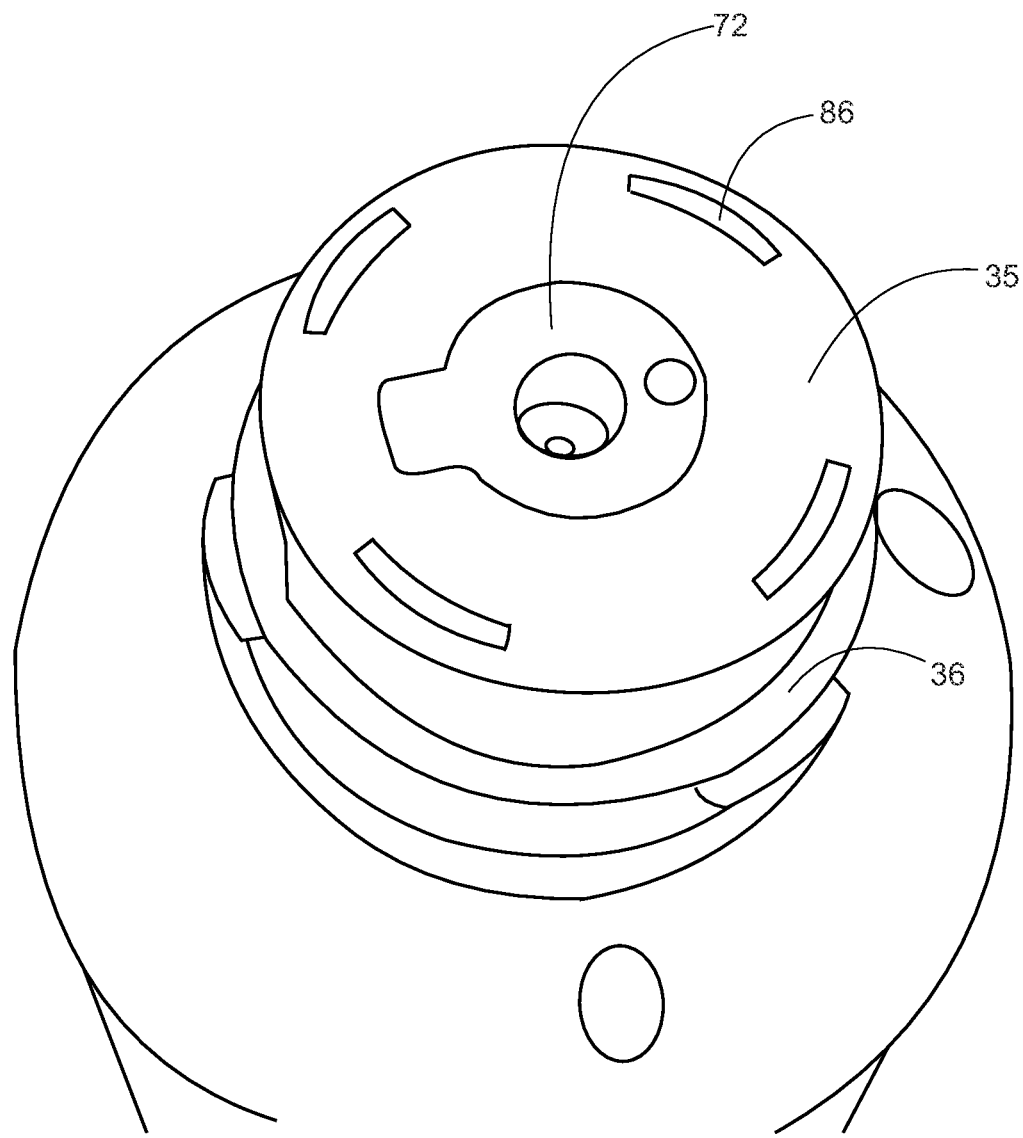
FIG. 24 is a top perspective view of the bottle.

As seen in FIG. 24, the bottle is installed next. The bottle has an adapter gasket 72 formed of an elastomeric material that seals to the pump housing. The adapter gasket 72 is mounted on the bottle adapter 35. The bottle adapter 35 additionally includes adapter hooks 86. The bottle has adapter protrusions 36 that engage to a bottle receiving connection 300.

Figure 25:
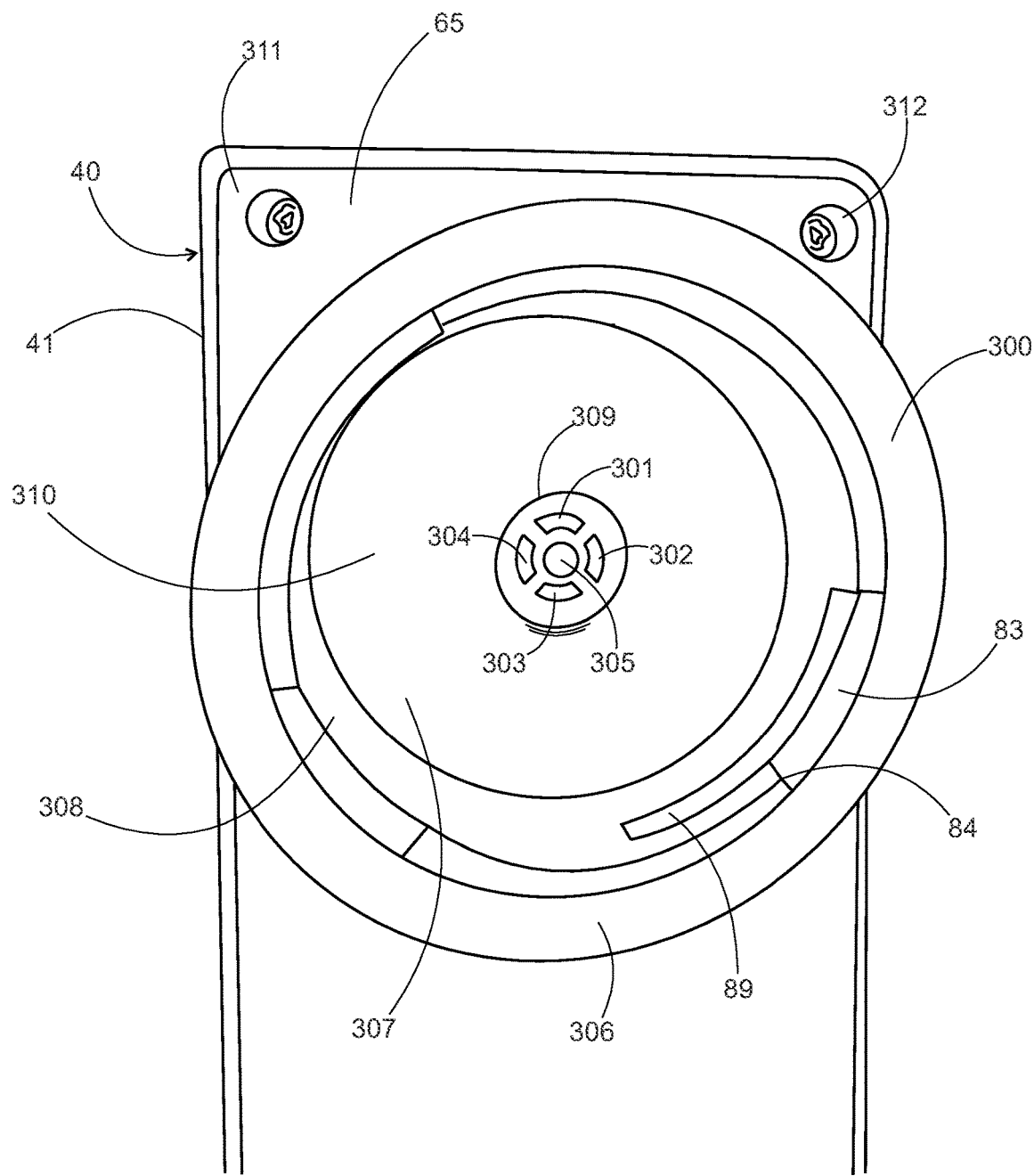
FIG. 25 is a bottom perspective view of the bottle adapter receiver frame.

As seen in FIG. 25, the bottle is installed to the bottle receiving connection socket 307 of the bottle receiving connection 300. The bottle receiving connection 300 can be formed with a bottle receiving connection socket wall 306 extending downwardly from the bottle adapter receiver frame lower surface 311 of the bottle adapter receiver frame 65. The bottle receiving connection socket wall 306 has a bottle receiving connection inside wall surface 308 that extends upwardly to a bottle receiving socket upper wall 310. The bottle receiving connection inside wall surface 308 has a bottle adapter intake funnel 83 that leads to a bottle adapter retainer bump 84 and then a bottle adapter retainer slot 89 which receives the adapter protrusion 36 of the bottle which is lodged in the bottle adapter retainer slot 89. Preferably, at least a pair of bottle adapter retainer slots 89 is employed for retaining a pair of adapter protrusions 36.

The inlet nozzle tip 309 protrudes downwardly from the bottle receiving socket upper wall 310. The mixer pump 40 has a mixer pump housing 41 which includes a bottle adapter receiver frame 65 having a bottle adapter receiver frame lower surface 311. The bottle adapter receiver frame lower surface 311 is retained to the mixer pump housing 41 at bottle adapter receiver frame connectors 312.

The inlet nozzle tip 309 inserts into the adapter gasket 72 in the circular adapter gasket opening on the upper surface of the adapter gasket 72. Preferably, the inlet nozzle tip 309 includes an inlet nozzle tip first conduit 301 formed as an arc shaped conduit, and inlet nozzle tip second conduit 302 formed as an arc shaped conduit and oriented 90 degrees to the inlet nozzle tip first conduit 301. The inlet nozzle tip third conduit 303 is preferably an arc shaped conduit oriented 90 degrees to the inlet nozzle tip second conduit 302. The inlet nozzle tip fourth conduit 304 is preferably an arc shaped conduit oriented 90 degrees to the inlet nozzle tip third conduit 303. The inlet nozzle tip fifth conduit 305 is preferably a circular shaped conduit formed between the inlet nozzle tip first conduit 301, the inlet nozzle tip second conduit 302, inlet nozzle tip third conduit 303, and inlet nozzle tip fourth conduit 304.

As seen in FIGS. 26-29, the swivel socket circlip 135 can further be modified for use as a wrench tool with the addition of swivel socket circlip engagements which can include a first swivel socket circlip wrench tooth 123 and a second swivel socket circlip wrench tooth 124. The first wrench tooth and the second wrench tooth are preferably formed in the swivel socket circlip upper slot 285. The wrench retaining gap 125 is formed between the first wrench tooth and the second wrench tooth and can also be part of the swivel socket circlip engagement.

Figure 26:
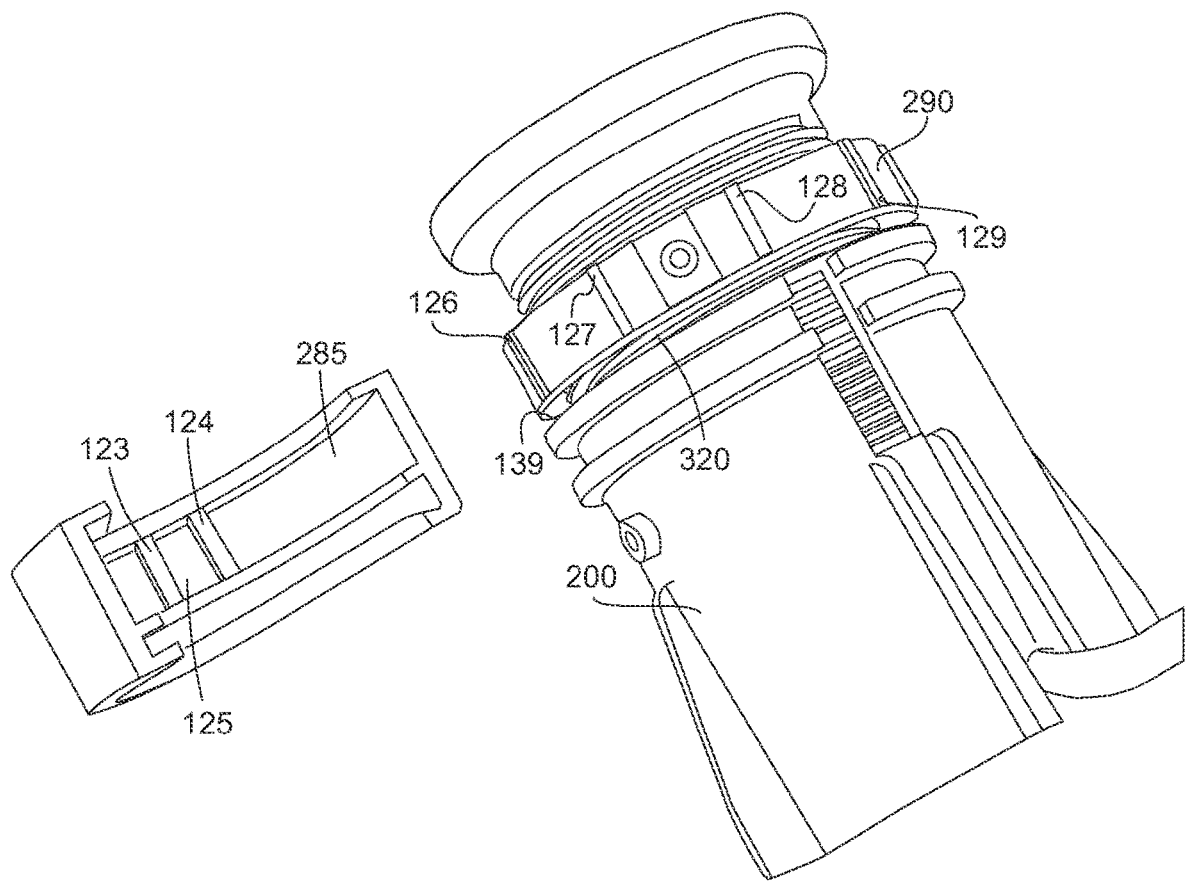
FIG. 26 is an exploded view diagram showing the swivel socket circlip being used as a wrench tool.

As seen in FIG. 26, the mounting shaft nut retainer 290 has a plurality of mounting shaft nut retainer teeth that engage to at least one of the wrench teeth on the swivel socket circlip upper slot 285. The mounting shaft nut retainer teeth constitute a mounting shaft nut retainer engagement and as little as one mounting shaft nut retainer tooth can be used to provide a mounting shaft nut retainer engagement. The mounting shaft nut retainer teeth may include a first mounting shaft nut retainer tooth 126, a second mounting shaft nut retainer tooth 127, a third mounting shaft nut retainer tooth 128, an a fourth mounting shaft nut retainer tooth 129 spaced around the circumferential periphery of the mounting shaft nut retainer. During an initial position at initial assembly, the mounting shaft nut retainer 290 is loose relative to the barrel 200 such that a mounting shaft nut retainer gap 320 exists between the pump outlet opening flange 139, and the lower edge of the mounting shaft nut retainer 290.

Figure 27:
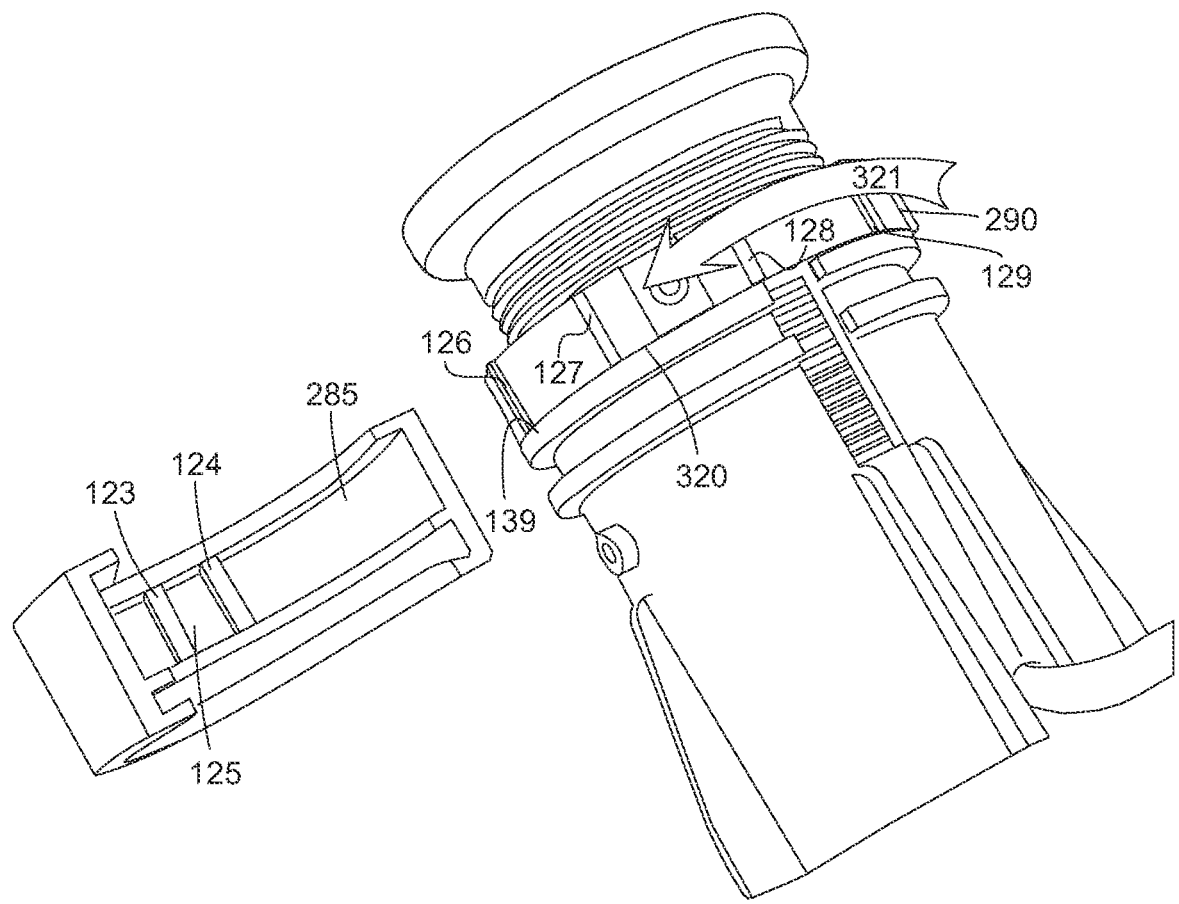
FIG. 27 is an exploded view diagram showing the swivel socket circlip being used as a wrench tool.

The user first tightens the mounting shaft nut retainer 290 to close the mounting shaft nut retainer gap 320 as seen in FIG. 27. The mounting shaft nut retainer tightening rotation 321 allows the swivel socket circlip upper slot 285 to receive the pump outlet opening flange 139 and the mounting shaft nut retainer 290.

Figure 28:
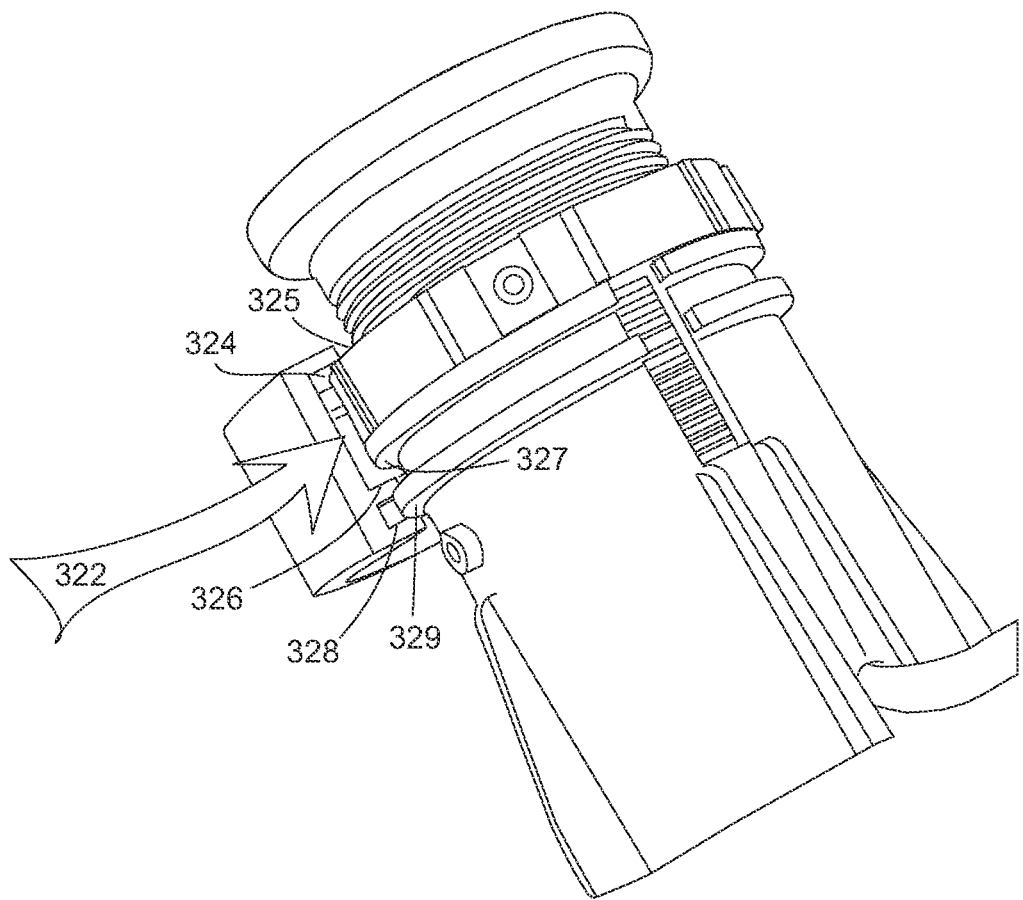
FIG. 28 is an exploded view diagram showing the swivel socket circlip being used as a wrench tool.
Figure 29:
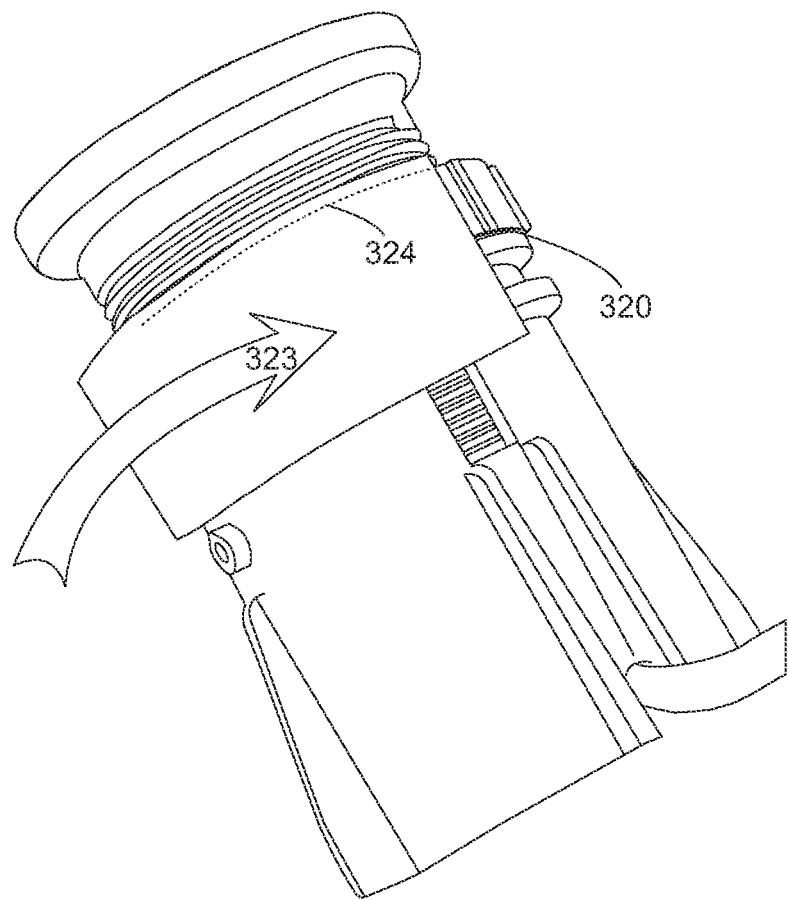
FIG. 29 is an exploded view diagram showing the swivel socket circlip being used as a wrench tool.

As seen in FIG. 28, the swivel socket circlip 135 is engaged with a swivel socket circlip engagement translation 322. After a user pushes the swivel socket circlip 135 into the engaged position, the user can then turn the swivel socket circlip 135 as a wrench because the teeth of the swivel socket circlip 135 engage the teeth of the mounting shaft nut retainer 290. The user then uses the mechanical engagement at the swivel socket circlip upper slot 285 to rotate the mounting shaft nut retainer in the opposite direction as seen in FIG. 29 in a mounting shaft nut retainer engaging rotation 323. The opposite rotation opens the mounting shaft nut retainer gap 320 so that the swivel socket circlip upper slot upper engagement surface 324 engages the mounting shaft nut retainer upper surface 325 in an abutment engagement. As seen in FIG. 28, the abutment engagement of the upper surface biases the swivel socket circlip upper slot lower surface 326 against the pump outlet opening flange lower surface 327 and or biases the swivel socket circlip lower slot lower surface 328 against the lower barrel flange lower surface 329.

As a user grasps the swivel socket circlip sidewall 330 and rotates it, the user uses the swivel socket circlip as a wrench. Then, the swivel socket circlip sidewall 330 is disposed in tension which provides a locking force to lock the counter mount spout extension 24.

Previously, the mounting shaft nut retainer tightening rotation 321 provided slack at the swivel socket circlip upper slot upper engagement surface 324. After tightening, a small mounting shaft nut retainer gap 320 reemerges, as seen in FIG. 29, but is relatively small and not readily noticeable by a casual observer.

The invention claimed is:

1. A counter mount fluid dispenser comprising:
   a. a spout having an opening for dispensing a fluid;
   b. a connection shaft, wherein the connection shaft extends downwardly from the spout;
   c. a mounting shaft having a mounting shaft nut that is configured with the spout to engage a countertop by clamping force when the mounting shaft is threadedly connected to the connection shaft, wherein the mounting shaft nut has a mounting shaft nut lower extension;
   d. a mounting shaft nut external thread formed on an external surface of the mounting shaft nut lower extension;
   e. a mounting shaft nut retainer, wherein the mounting shaft nut retainer is threaded to the mounting shaft nut lower extension;
   f. a swivel socket circlip, wherein the swivel socket circlip has a swivel socket circlip upper slot, wherein the swivel socket circlip upper slot engages a pump outlet opening flange and the mounting shaft nut retainer, wherein the pump outlet opening flange is connected to a pump housing to support the pump housing when the swivel socket circlip is installed to the pump outlet opening flange and the mounting shaft nut retainer; and
   g. a fluid pump mounted in the pump housing.

2. The counter mount fluid dispenser of claim 1, wherein the mounting shaft nut retainer has a mounting shaft nut retainer engagement that engages a swivel socket circlip engagement so that the swivel socket circlip acts as a wrench for rotating the mounting shaft nut retainer, wherein after installation of the mounting shaft nut retainer engagement to the swivel socket circlip engagement, rotation of the swivel socket circlip also rotates the mounting shaft nut retainer and locks the swivel socket circlip to the mounting shaft nut retainer when the mounting shaft nut retainer is rotated away from the pump outlet opening flange.

3. The counter mount fluid dispenser of claim 2, wherein the swivel socket circlip upper slot has a swivel socket circlip upper slot surface that biases against a mounting shaft nut retainer upper surface, wherein the swivel socket circlip upper slot has a swivel socket circlip upper slot lower surface that biases against a pump outlet opening flange lower surface when the mounting shaft nut retainer is rotated away from the pump outlet opening flange.

4. The counter mount fluid dispenser of claim 2, wherein the swivel socket circlip further includes a swivel socket circlip lower slot, wherein the swivel socket circlip lower slot engages a lower barrel flange, wherein the lower barrel flange is formed under the pump outlet opening flange on an upwardly extending barrel formed on the pump housing.

5. The counter mount fluid dispenser of claim 2, wherein the swivel socket circlip upper slot has a swivel socket circlip upper slot surface that biases against a mounting shaft nut retainer upper surface, wherein the swivel socket circlip upper slot has a swivel socket circlip upper slot lower surface that biases against a pump outlet opening flange lower surface when the mounting shaft nut retainer is rotated away from the pump outlet opening flange.

6. The counter mount fluid dispenser of claim 1, wherein the swivel socket circlip further includes a swivel socket circlip lower slot, wherein the swivel socket circlip lower slot engages a lower barrel flange, wherein the lower barrel flange is formed under the pump outlet opening flange on an upwardly extending barrel formed on the pump housing.

7. The counter mount fluid dispenser of claim 6, wherein the mounting shaft nut retainer has a mounting shaft nut retainer engagement that engages a swivel socket circlip engagement so that the swivel socket circlip acts as a wrench for rotating the mounting shaft nut retainer, wherein after installation of the mounting shaft nut retainer engagement to the swivel socket circlip engagement, rotation of the swivel socket circlip also rotates the mounting shaft nut retainer and locks the swivel socket circlip to the mounting shaft nut retainer when the mounting shaft nut retainer is rotated away from the pump outlet opening flange.

8. The counter mount fluid dispenser of claim 1, wherein the spout mounting shaft is connected to a swivel base at a lower end of the spout mounting shaft, wherein the swivel base swivels relative to the connection shaft.

9. The counter mount fluid dispenser of claim 8, wherein the mounting shaft nut retainer has a mounting shaft nut retainer engagement that engages a swivel socket circlip engagement so that the swivel socket circlip acts as a wrench for rotating the mounting shaft nut retainer, wherein after installation of the mounting shaft nut retainer engagement to the swivel socket circlip engagement, rotation of the swivel socket circlip also rotates the mounting shaft nut retainer and locks the swivel socket circlip to the mounting shaft nut retainer when the mounting shaft nut retainer is rotated away from the pump outlet opening flange.

\* \* \* \* \*